(12) United States Patent
Guadagno et al.

(10) Patent No.: US 7,082,458 B1
(45) Date of Patent: Jul. 25, 2006

(54) DIALOG FACILITATION SYSTEM FOR GENERATING CONTEXTUAL ORDER-PRESERVING DIALOG POSTINGS AND POSTING SUMMARIES FROM ELECTRONIC MESSAGES

(76) Inventors: Luigi Guadagno, 3910 N. Fremont, Unit F, Chicago, IL (US) 60640; Okokon B. Okon, III, 4344 N. Clarendon Ave., #2, Chicago, IL (US) 60613; Armin Moehrle, 1407 W. Erie St., #4F, Chicago, IL (US) 60622; Edwin C. Price, 3270 N. Lake Shore Dr., #14E, Chicago, IL (US) 60657

( * ) Notice: Subject to any disclaimer, the term of this patent is extended or adjusted under 35 U.S.C. 154(b) by 767 days.

(21) Appl. No.: 09/920,025

(22) Filed: Aug. 1, 2001

(51) Int. Cl.
*G06F 15/16* (2006.01)
(52) U.S. Cl. .................. 709/204; 709/205; 709/206
(58) Field of Classification Search ........ 709/204–206, 709/245
See application file for complete search history.

(56) References Cited

U.S. PATENT DOCUMENTS

| | | |
|---|---|---|
| 5,355,364 A | 10/1994 | Abali |
| 5,493,692 A | 2/1996 | Theimer et al. |
| 5,694,616 A | 12/1997 | Johnson et al. |
| 5,781,857 A | 7/1998 | Hwang et al. |
| 5,819,243 A | 10/1998 | Rich et al. |
| 5,822,527 A | 10/1998 | Post |
| 5,872,927 A | 2/1999 | Shiels et al. |
| 5,878,230 A | 3/1999 | Weber et al. |
| 5,894,506 A | 4/1999 | Pinter |
| 5,917,489 A | 6/1999 | Thurlow et al. |
| 5,923,845 A | 7/1999 | Kamiya et al. |
| 5,960,173 A | 9/1999 | Tang et al. |
| 5,966,512 A | 10/1999 | Bates et al. |
| 5,999,967 A | 12/1999 | Sundsted |
| 6,038,296 A | 3/2000 | Brunson et al. |
| 6,052,812 A | 4/2000 | Chen et al. |
| 6,057,841 A | 5/2000 | Thurlow et al. |
| 6,073,165 A | 6/2000 | Narasimhan et al. |
| 6,081,832 A | 6/2000 | Gilchrist et al. |
| 6,092,114 A | 7/2000 | Shaffer et al. |
| 6,105,056 A | 8/2000 | Gilchrist et al. |
| 6,108,688 A | 8/2000 | Nielsen |
| 6,118,856 A | 9/2000 | Paarsmarkt et al. |
| 6,122,632 A | 9/2000 | Botts et al. |

(Continued)

OTHER PUBLICATIONS

"Automatic Structuring and Retrieval of Large Text Files" Gerard Salton, James Allan and Chris Buckley.

(Continued)

*Primary Examiner*—Wen-Tai Lin
(74) *Attorney, Agent, or Firm*—Jonathan Feuchtwang

(57) ABSTRACT

A dialog facilitator for preserving the spatial and temporal context of a dialog composed of a plurality of postings. The postings are packaged into messages having extended header information which are sent and received using a conventional messaging system. The dialog facilitator retrieves messages from the conventional messaging system, and uses information contained in the messages to populate a posting and a posting summary. Each posting contains detail information and an identifier uniquely identifying the posting., and each posting summary contains the posting identifier, content description information, and referential information identifying a relationship between postings. The referential information identifies whether the posting is related to other postings in the dialog store. Related posting include a commonly assigned dialog identifier. A media coordinator is provided for graphically depicting the spatial and temporal context of a selected dialog posting in relation to other postings belonging to a given dialog.

32 Claims, 25 Drawing Sheets

U.S. PATENT DOCUMENTS

| | | | |
|---|---|---|---|
| 6,125,363 A | 9/2000 | Buzzeo et al. | |
| 6,138,139 A | 10/2000 | Beck et al. | |
| 6,144,964 A | 11/2000 | Breese et al. | |
| 6,330,589 B1* | 12/2001 | Kennedy | 709/206 |
| 6,381,651 B1* | 4/2002 | Nishio et al. | 709/245 |
| 6,594,693 B1* | 7/2003 | Borwankar | 702/219 |
| 6,675,197 B1* | 1/2004 | Satoh et al. | 709/204 |
| 2002/0046245 A1* | 4/2002 | Hillar et al. | 709/205 |
| 2002/0133547 A1* | 9/2002 | Lin | 709/204 |
| 2002/0138582 A1* | 9/2002 | Chandra et al. | 709/206 |
| 2002/0156848 A1* | 10/2002 | Grouse | 709/204 |

OTHER PUBLICATIONS

"Automatic Hypertext Link Typing" James Allan, Center for Intelligent Information Retrieval, Department of Computer Science, University of Massachusetts, Amherst, MA 01003.

*cited by examiner

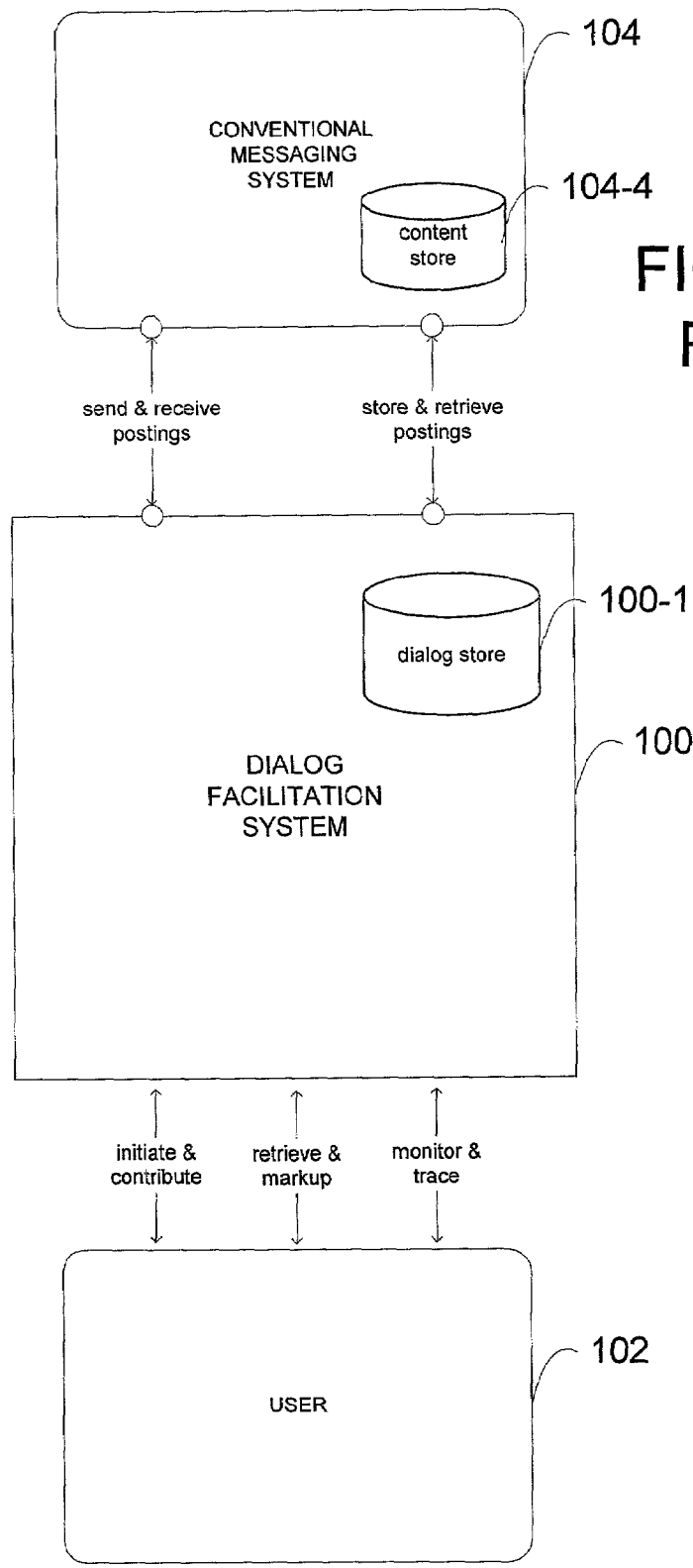

FIG. 1A (PRIOR ART): Roles and Parts of a Conventional Messaging System
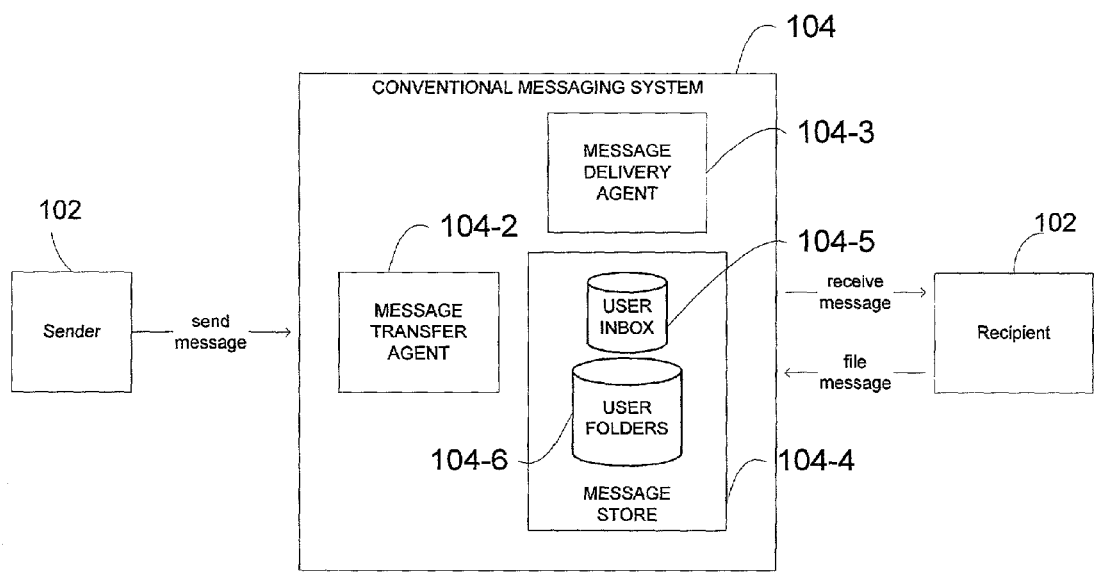

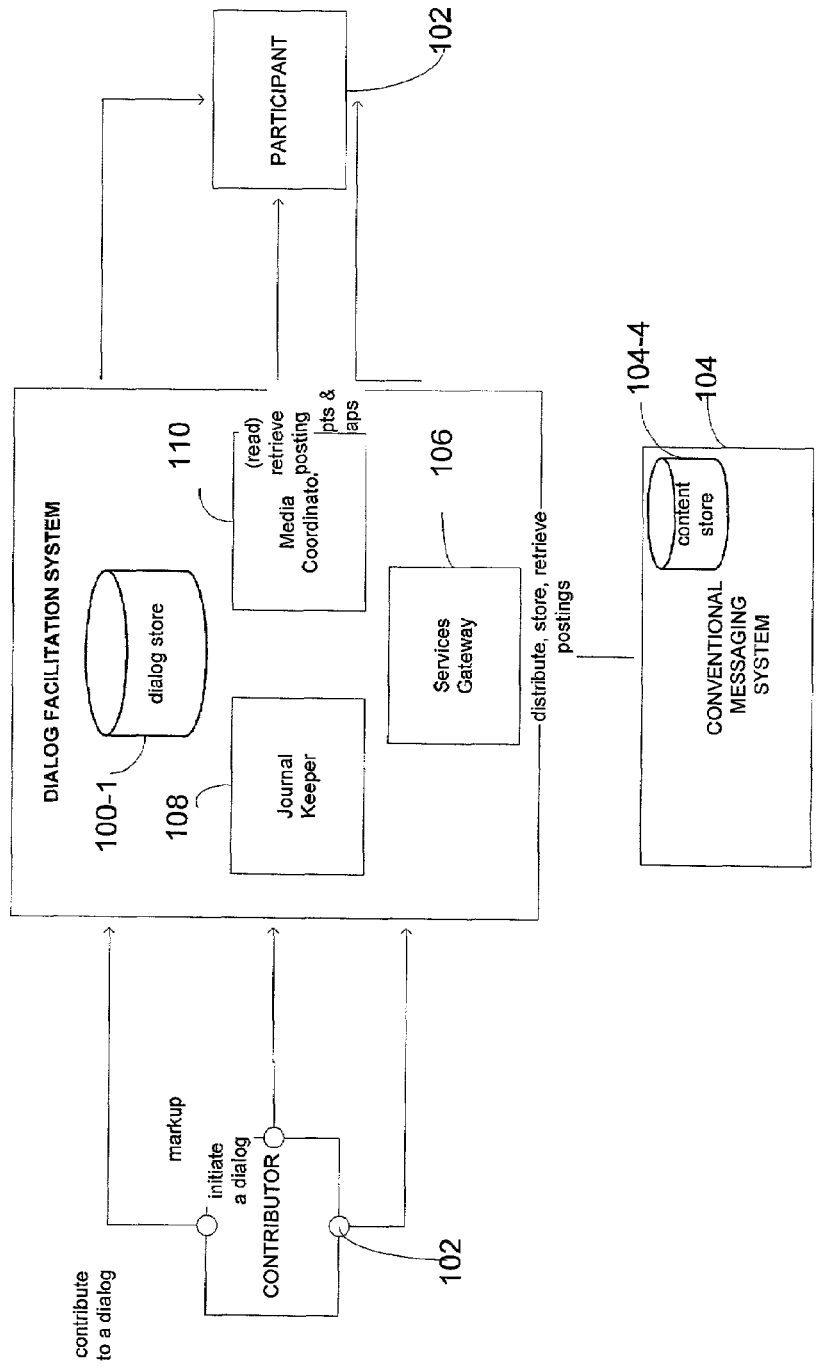
FIG. 1B: Roles and Parts of a Dialog Facilitation System

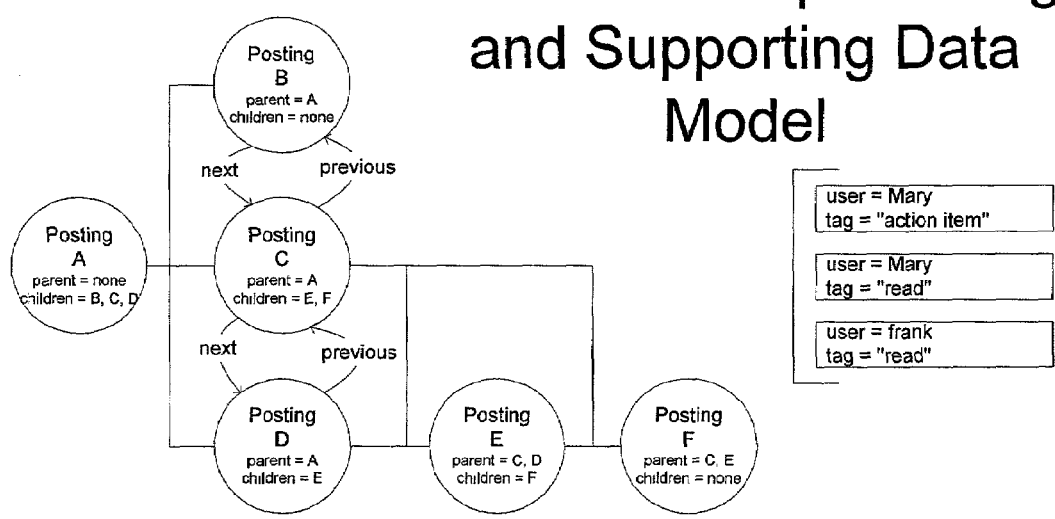
FIG. 1C: Sample Dialog and Supporting Data Model

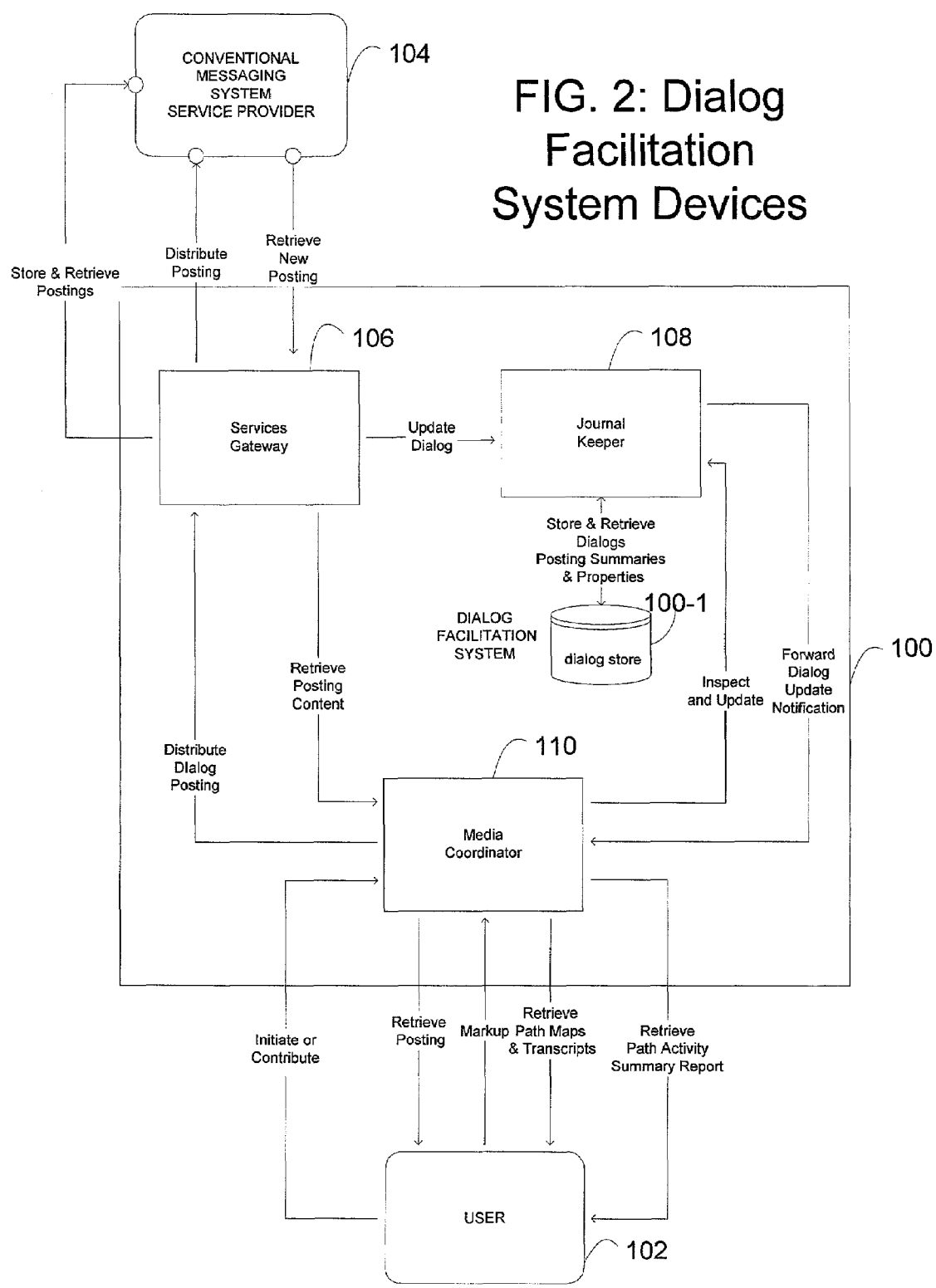

FIG. 3: Dialog Facilitation System Sample Deployment
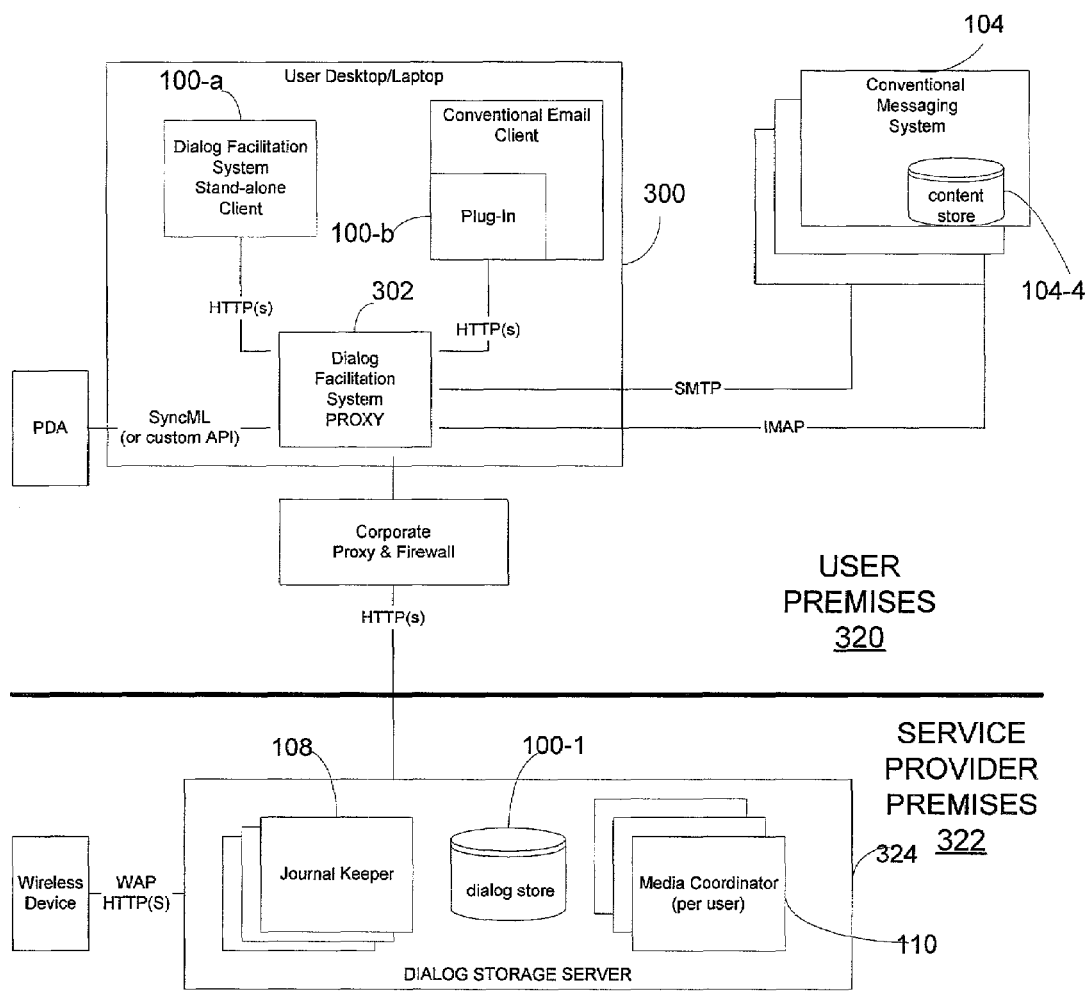

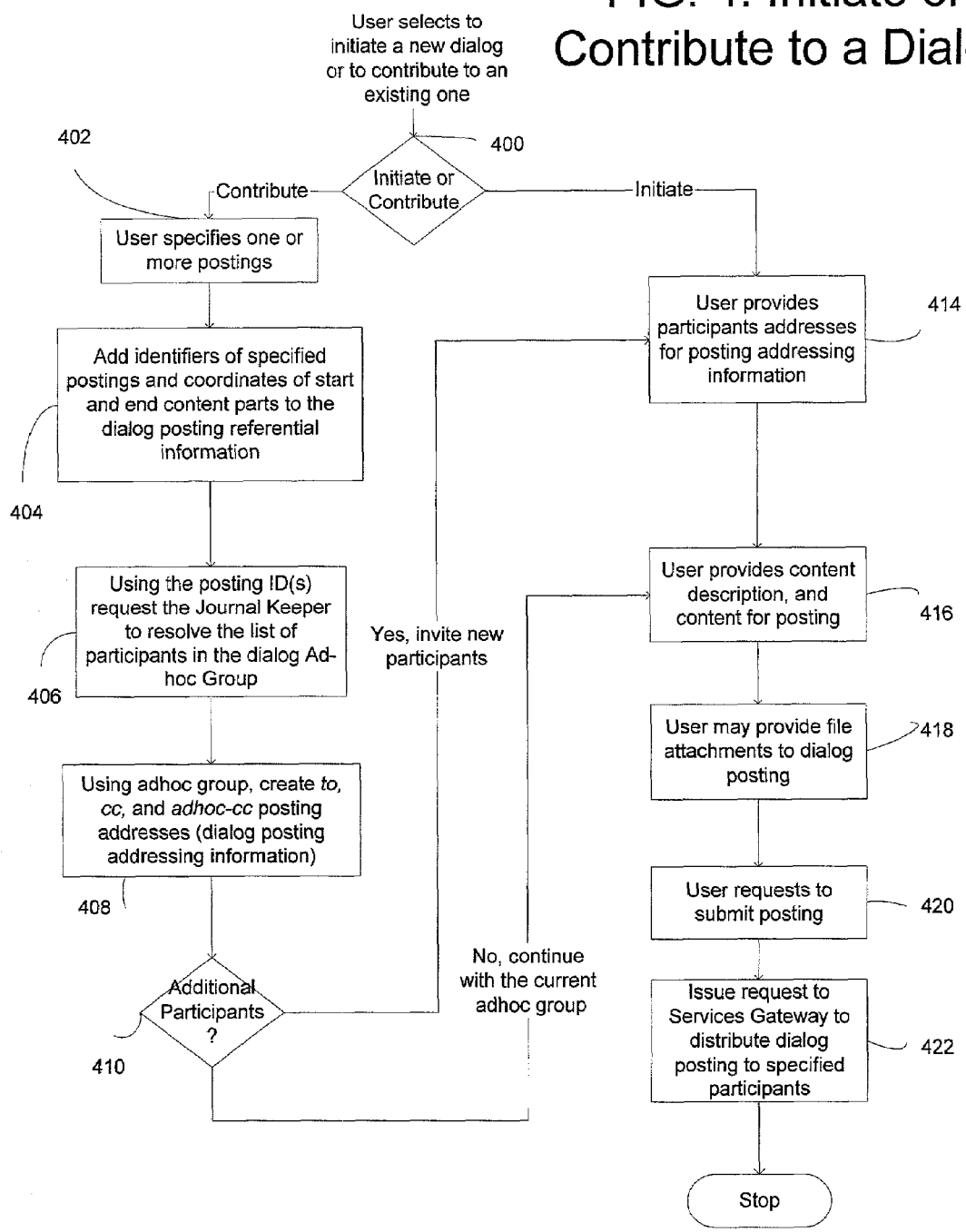

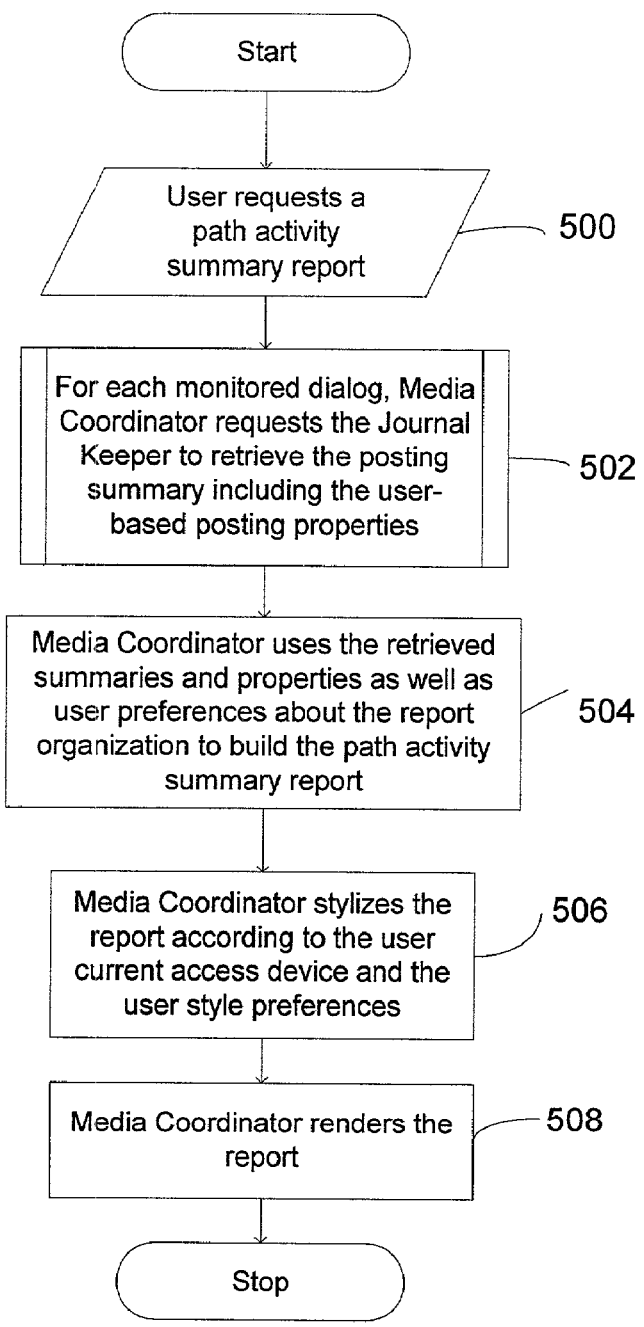
FIG. 5: Monitor Path Activity

FIG. 5A
FIG. 5c
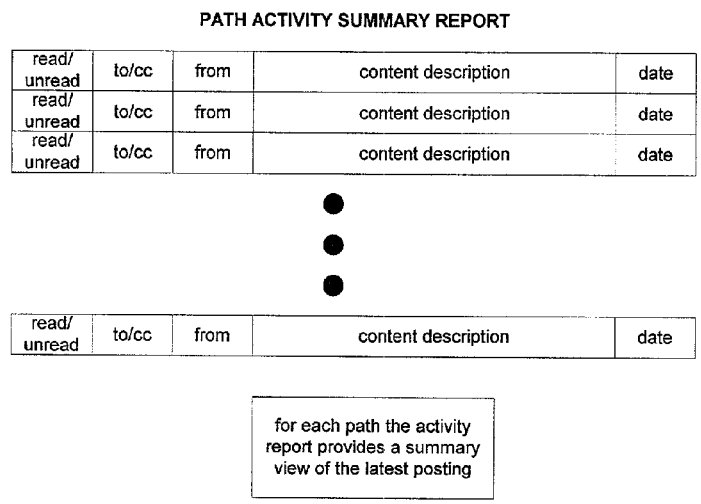
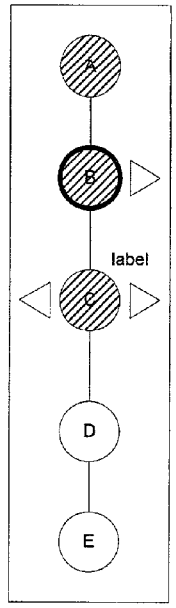
FIG. 5B

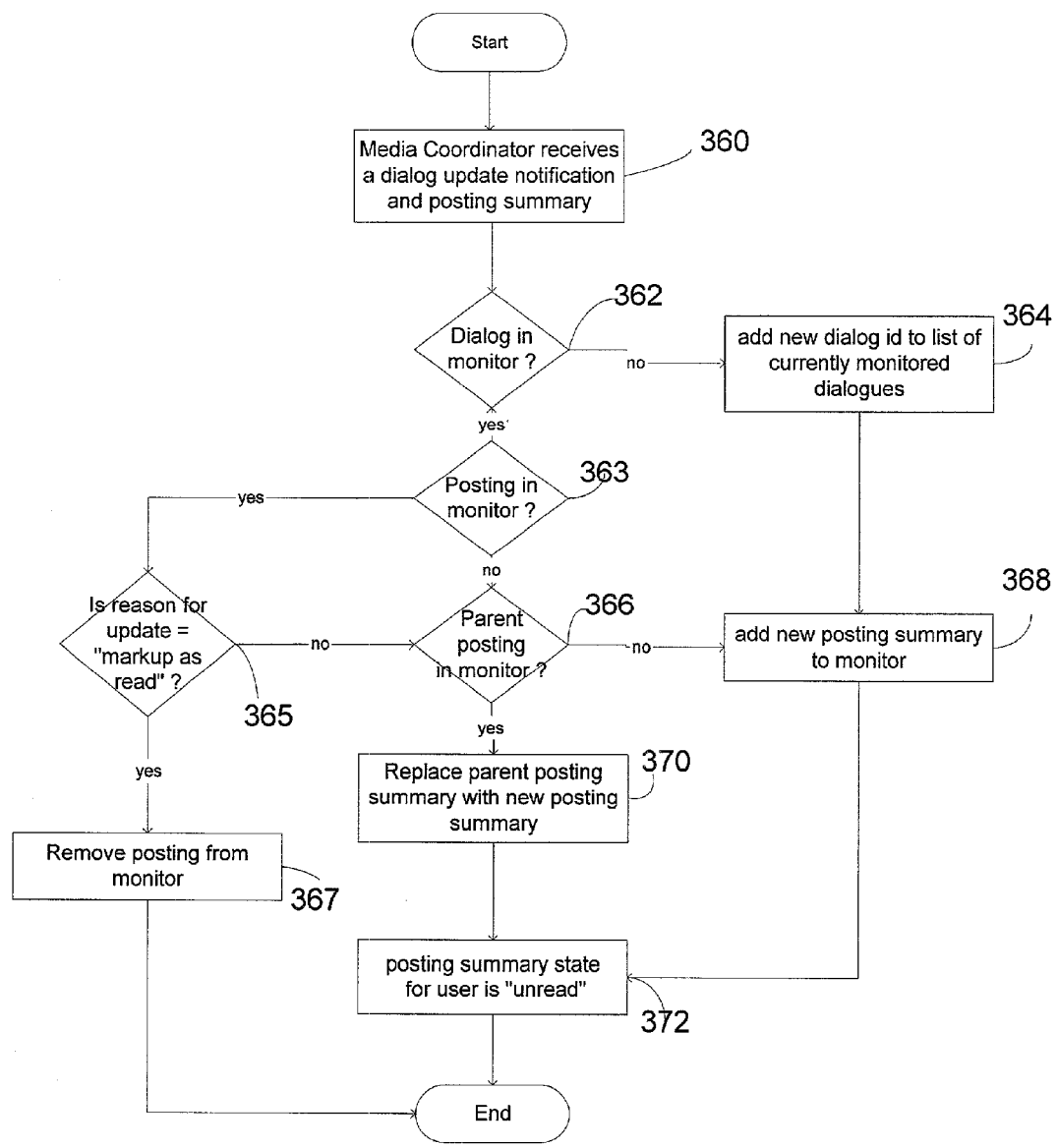
FIG. 6 Receiving Dialog Update Notifications

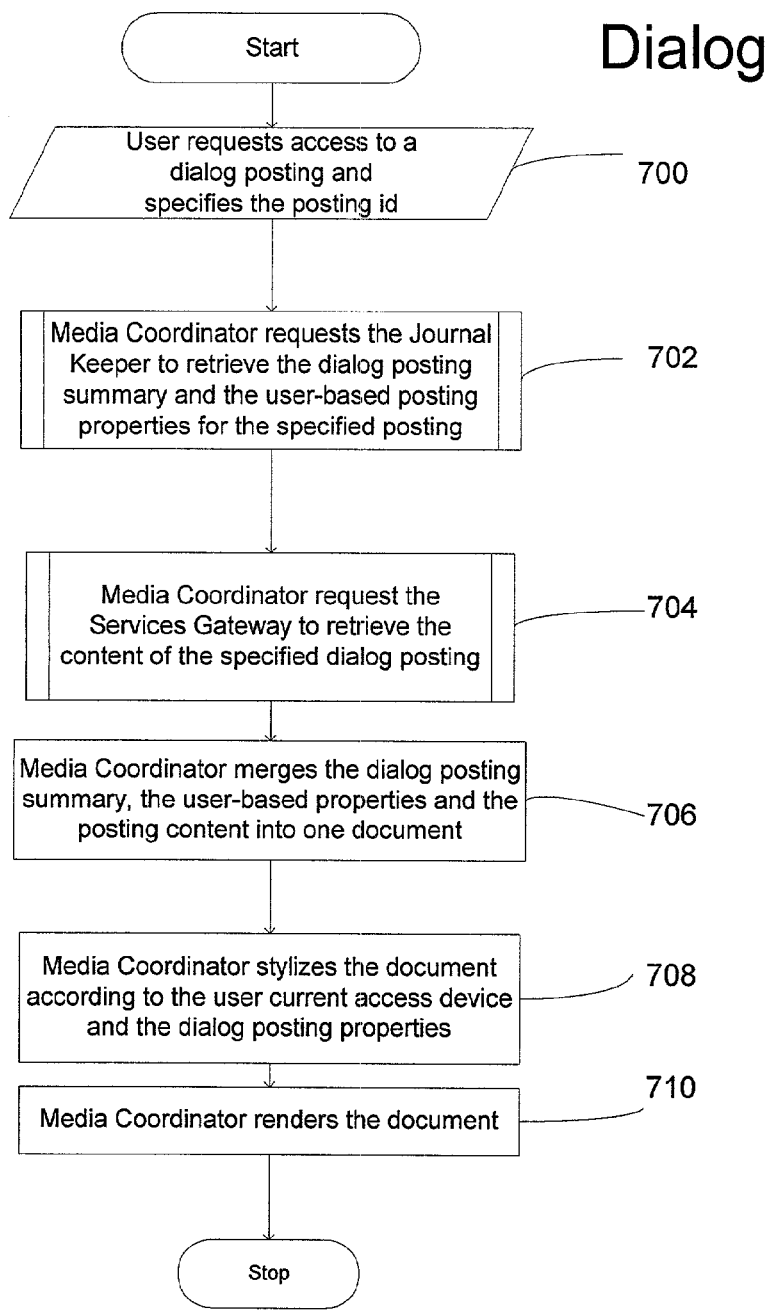
FIG. 7: Retrieving a Dialog Posting

FIG. 8: Retrieving Transcript and Path Map
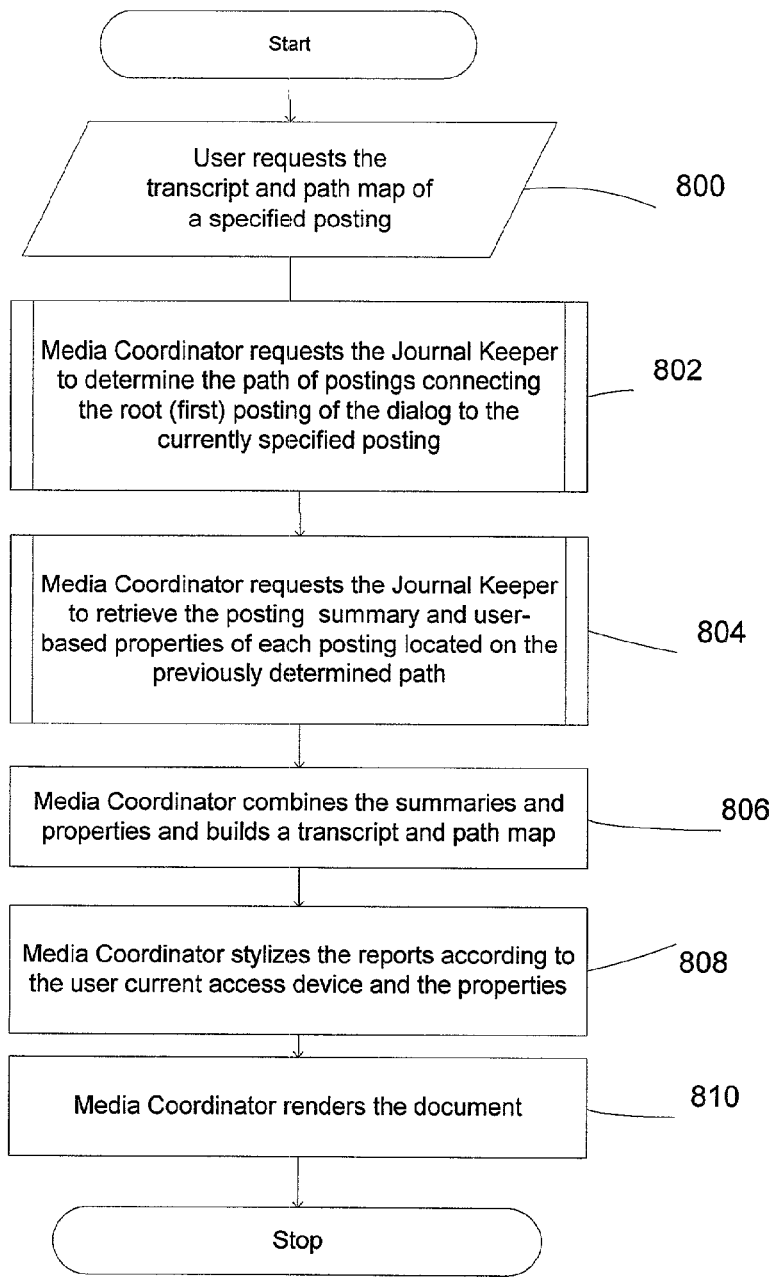

FIG. 9: Markup a Dialog, a Path, or a Posting
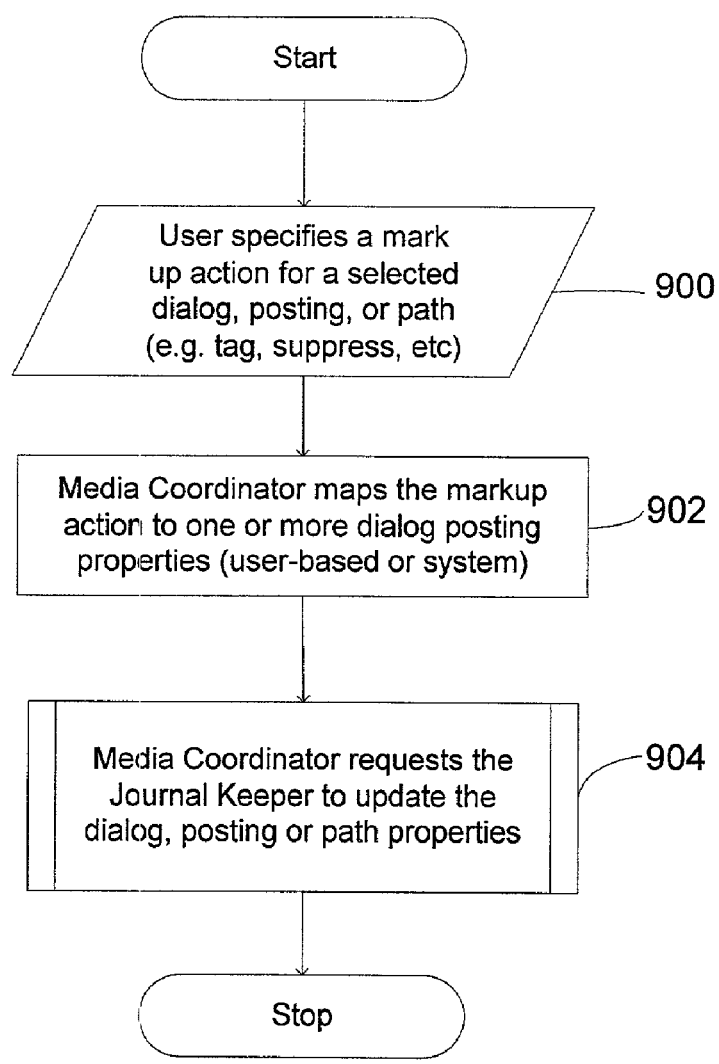

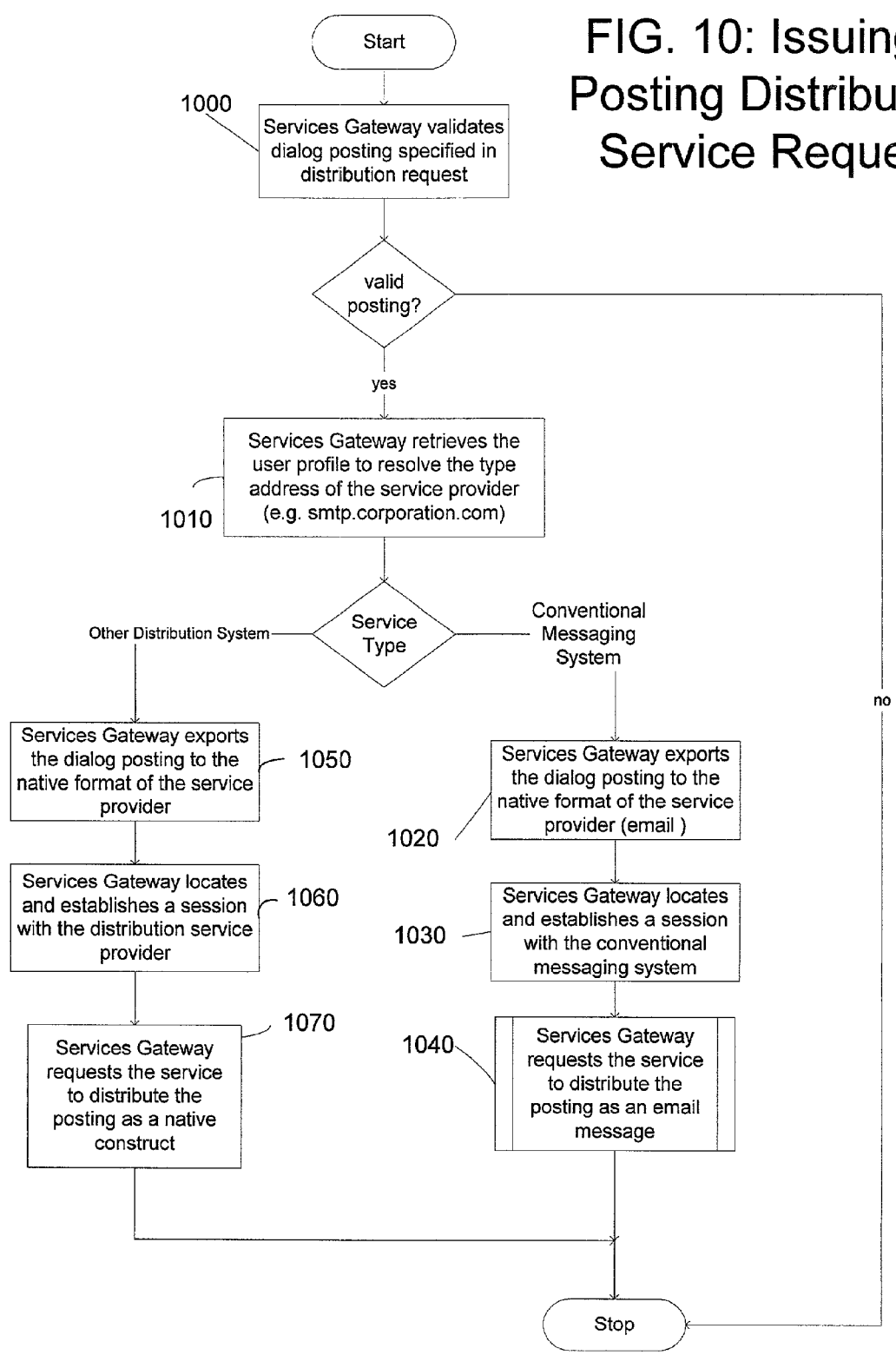

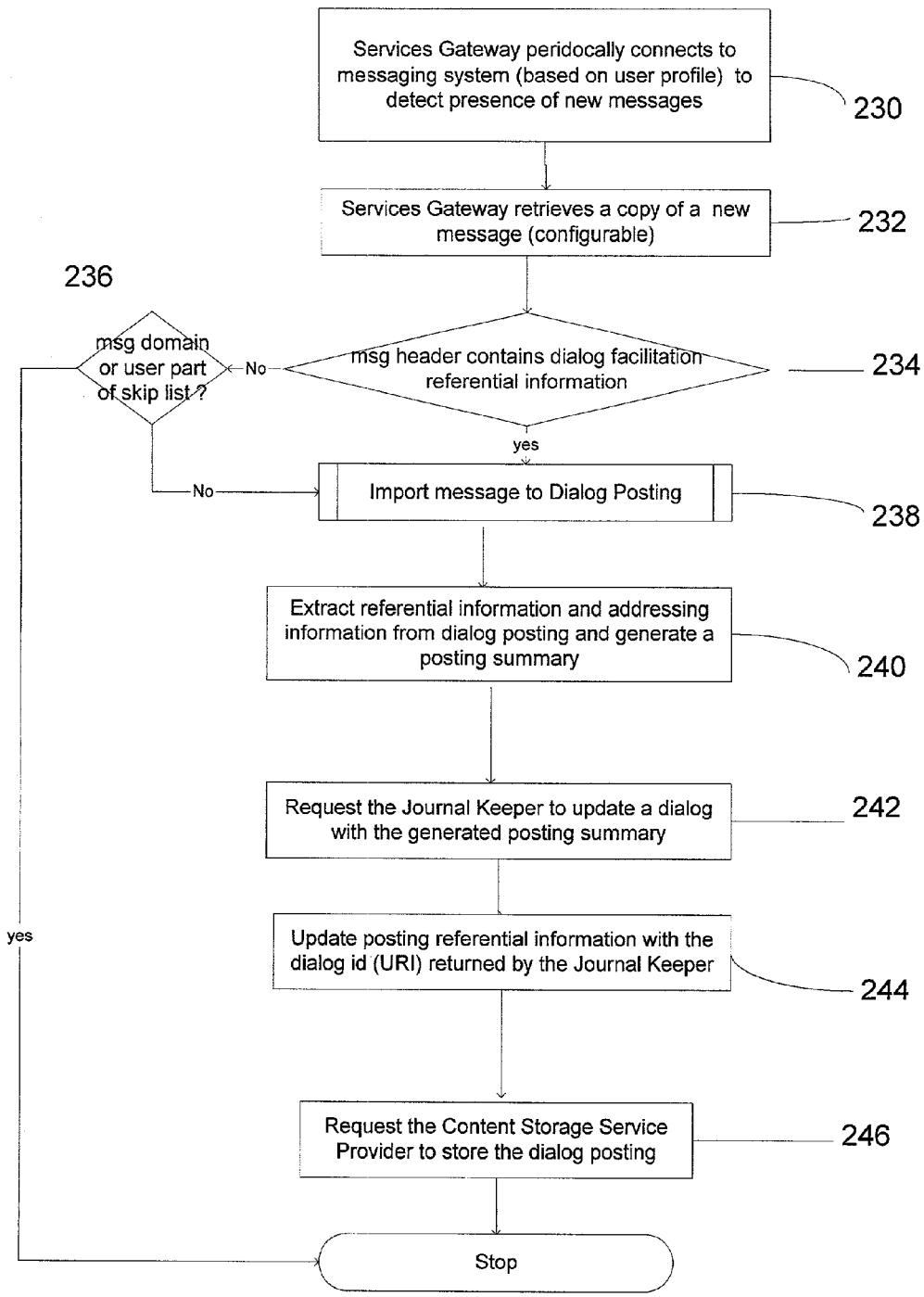
FIG. 11: Processing New Dialog Contributions

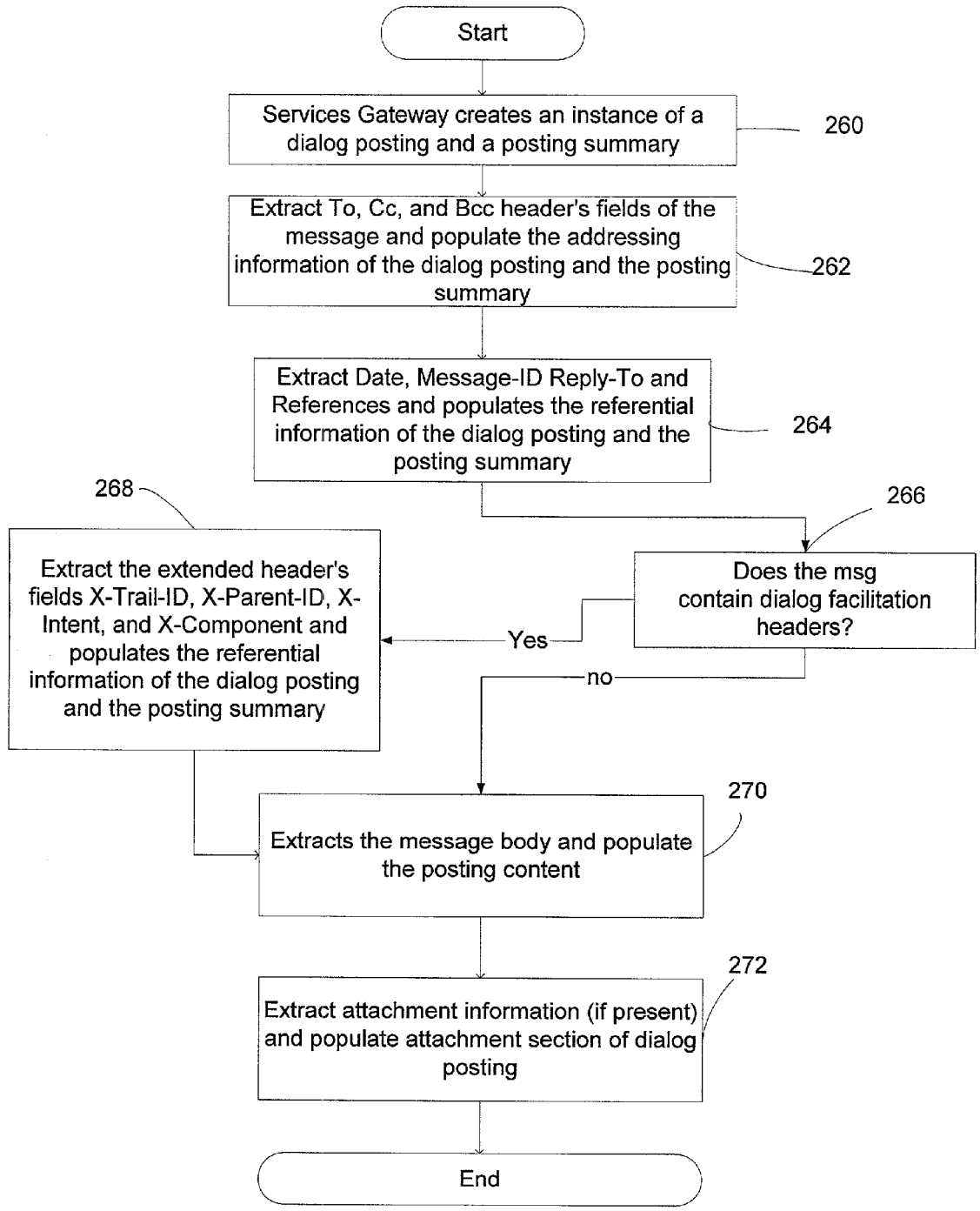
FIG. 12: Import posting from a (email) message

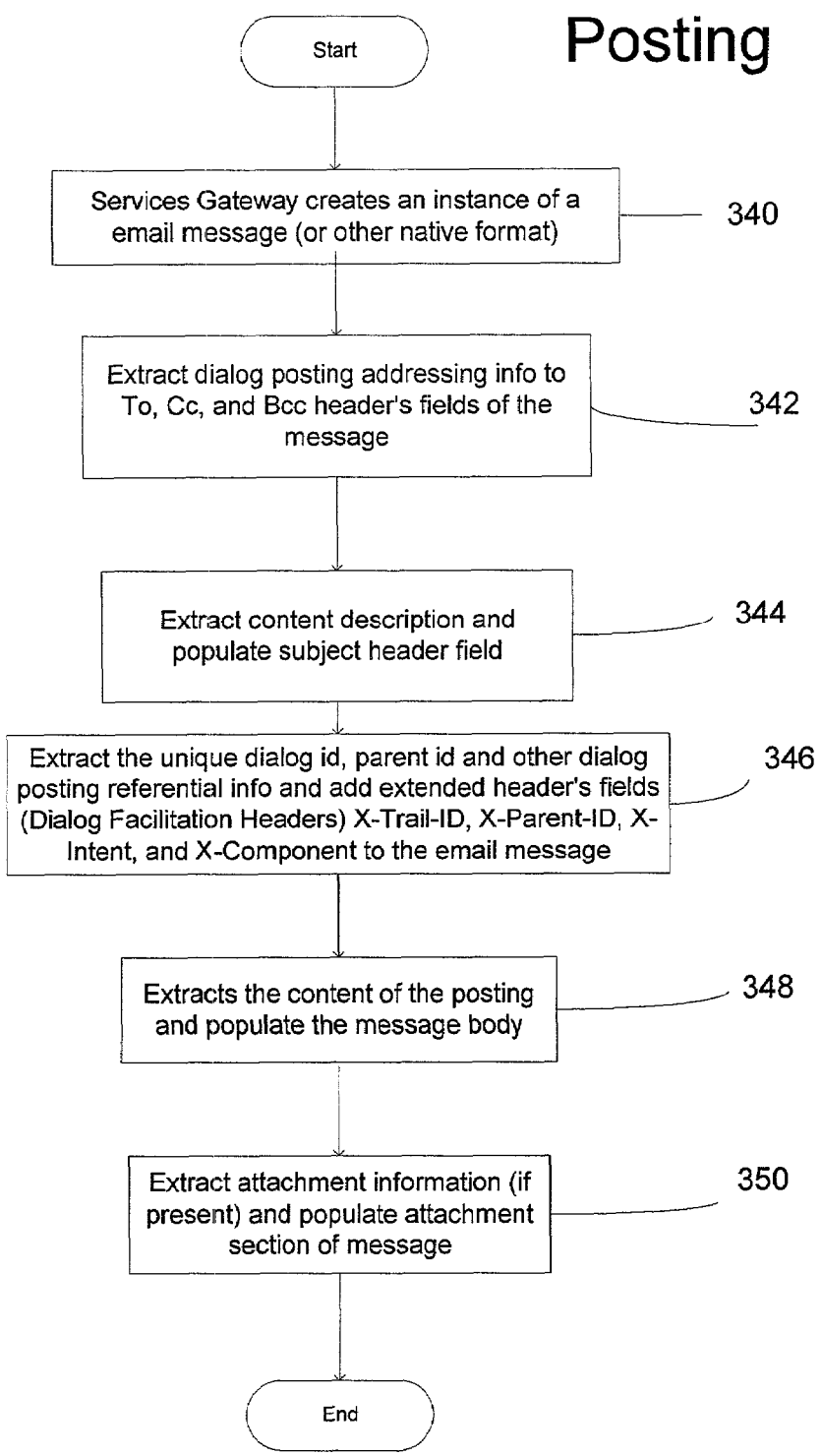

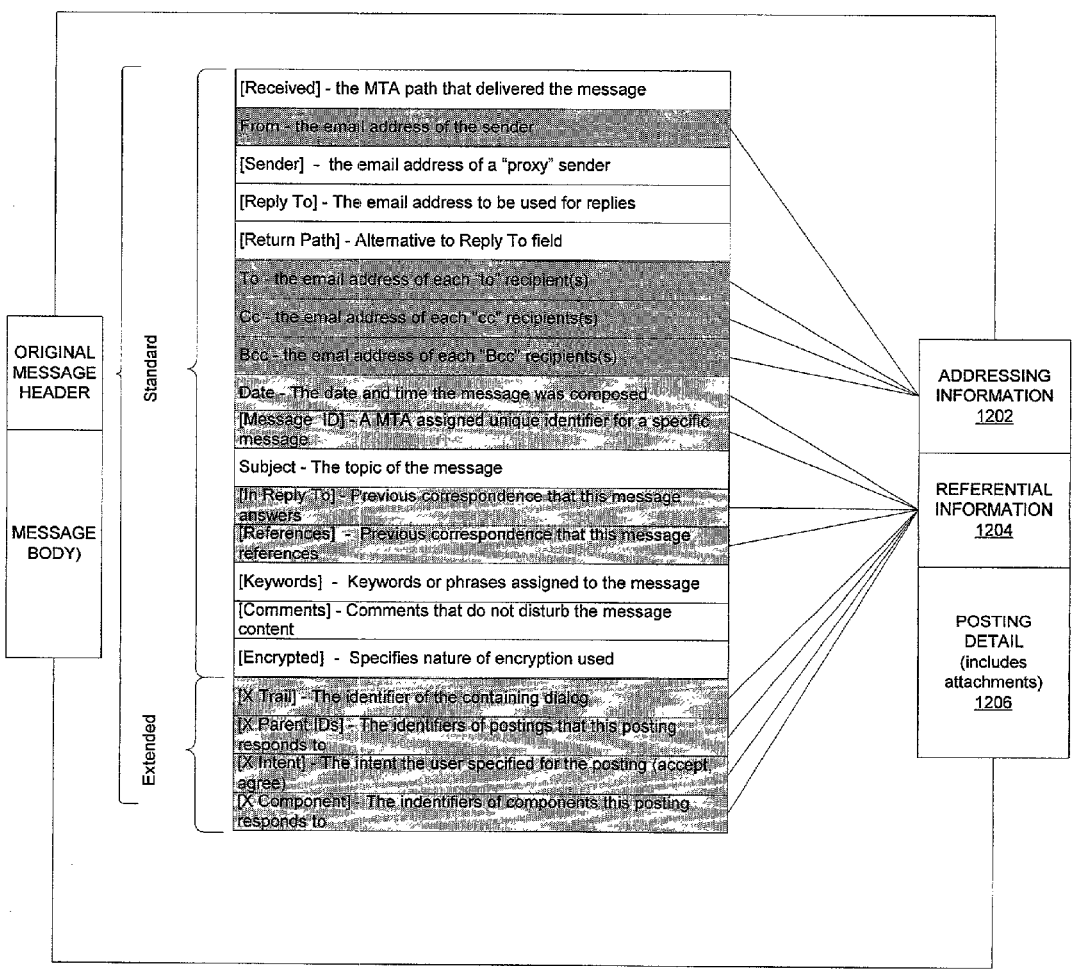
FIG. 12B: Mapping between an Email Message Format and a Dialog Posting Format

FIG. 12C: Dialog Posting and Posting Summary
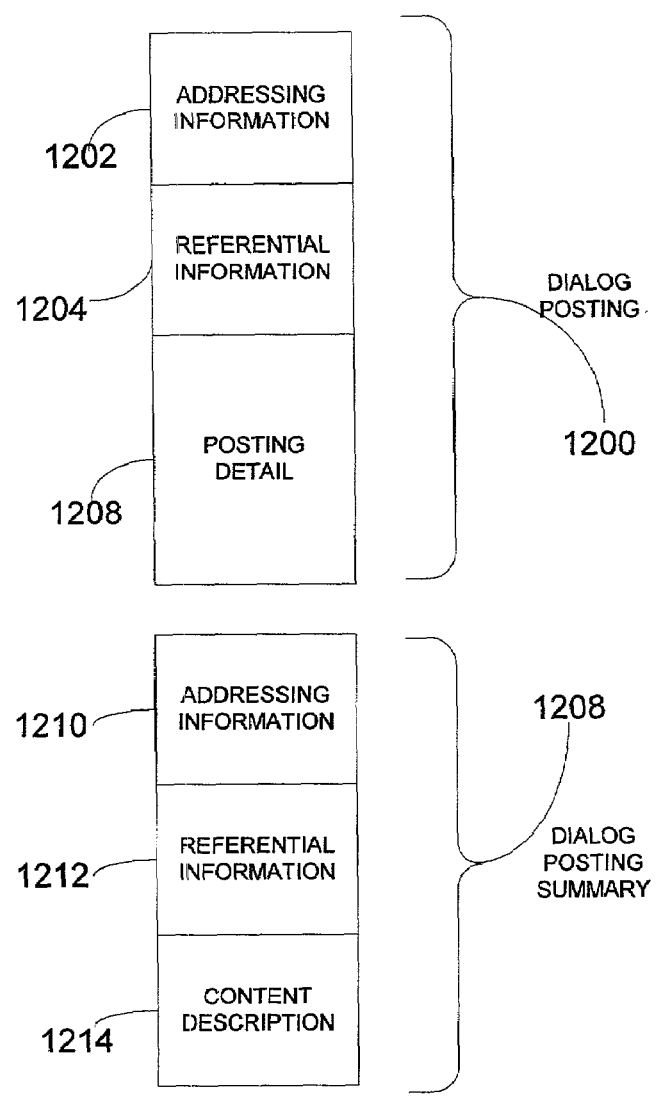

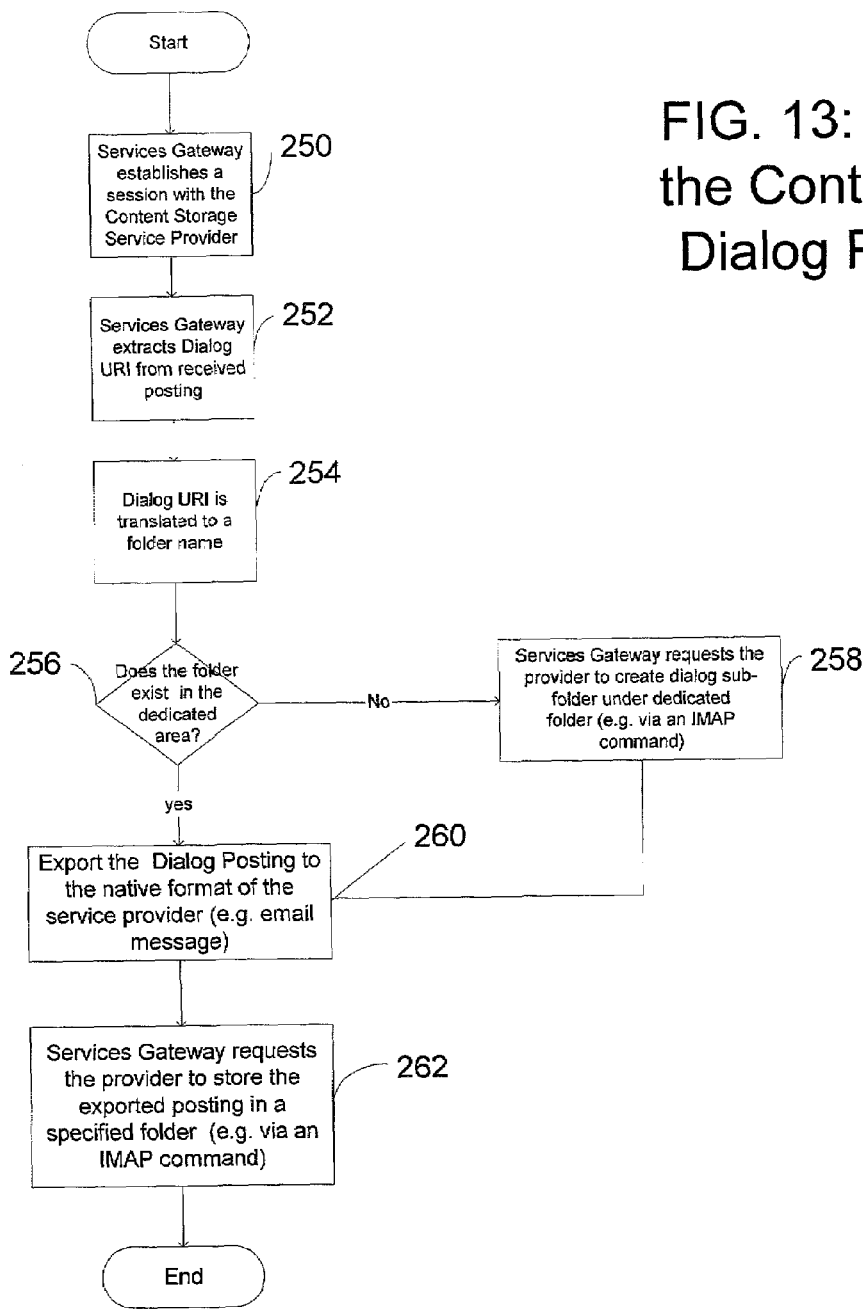

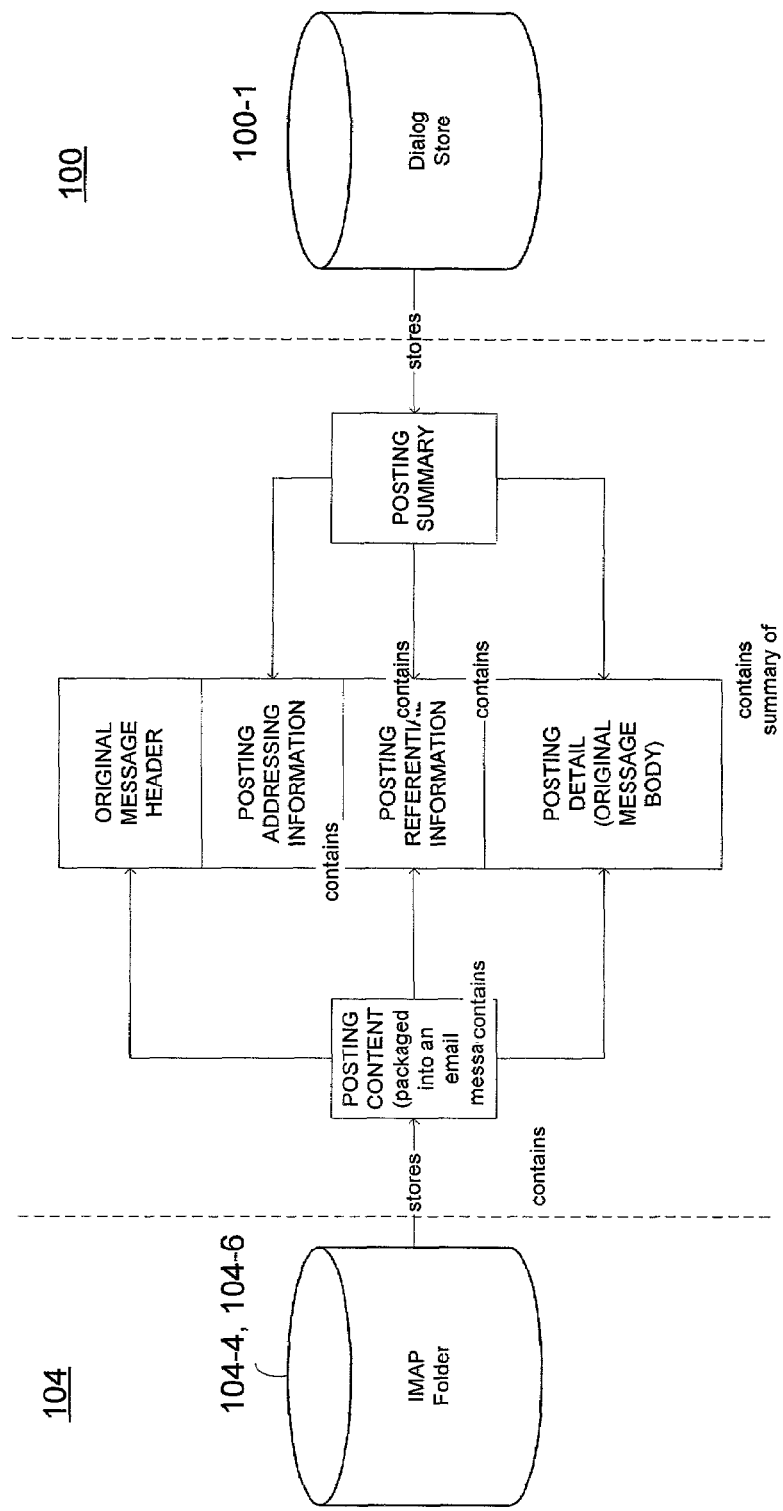
FIG. 14: Content Store and Dialog Store

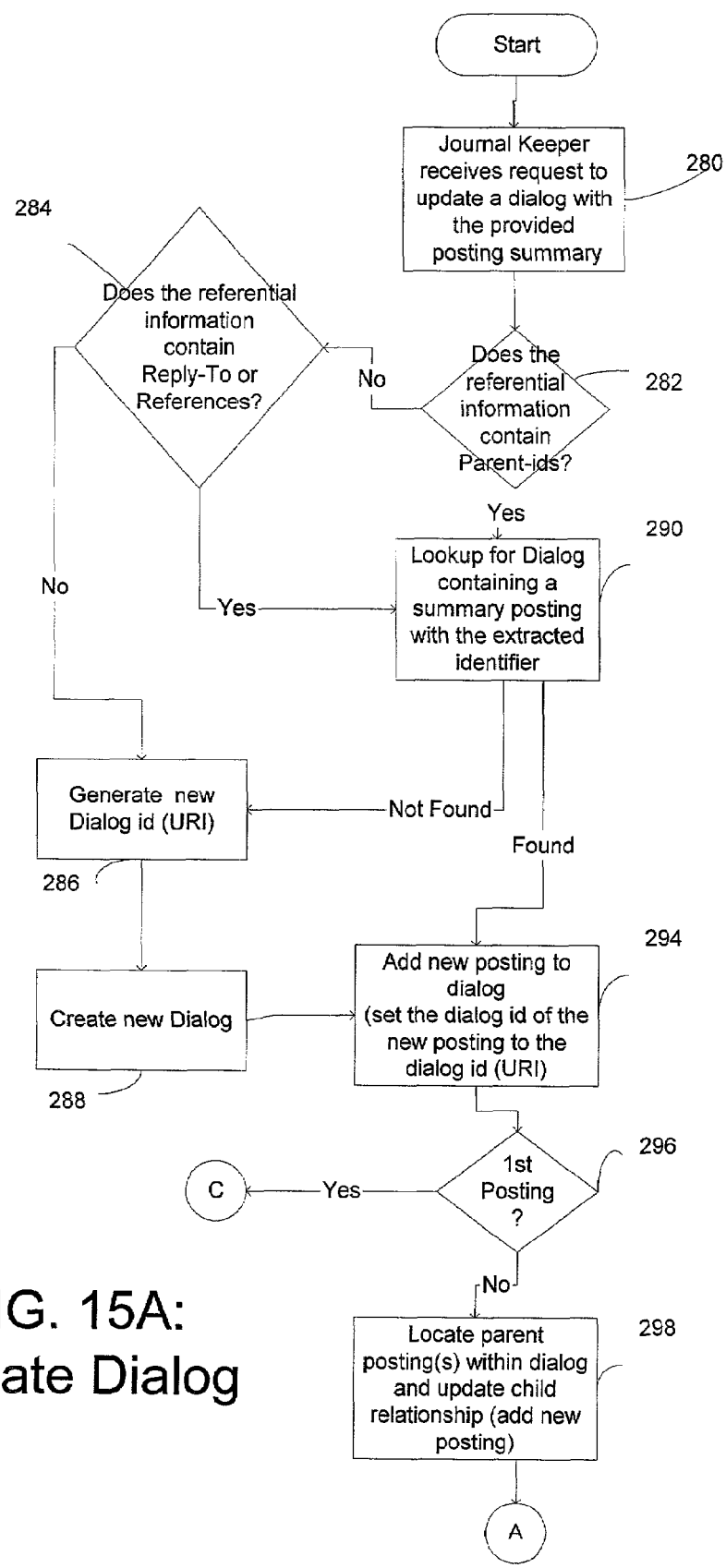
FIG. 15A: Update Dialog

DIALOG FACILITATION SYSTEM FOR GENERATING CONTEXTUAL ORDER-PRESERVING DIALOG POSTINGS AND POSTING SUMMARIES FROM ELECTRONIC MESSAGES

FIELD OF THE INVENTION

The present invention relates to a communications system with a framework that journals each contribution to a subject matter exchange conducted over a conventional messaging system. More particularly, the present invention provides a framework that processes the implicit user-specified mapping instructions of each contribution, journals the outcome to preserve the contextual order of each contribution, and delivers "artifacts" that enable a dynamic network of participants to contribute, monitor, trace, and markup an ongoing exchange carried over an electronic communications network.

BACKGROUND

Conventional electronic messaging systems such as email, newsgroups, bulletin boards and such are an integral part of the modern workplace. For a number of tasks these communication tools offer unmatched efficiency. Conventional messaging systems all ultimately employ one of two basic models of communication that pre-date any electronic form: the post office and bulletin board. For a wide range of "subject matter-based" occupations, these communication models are failing to fully enable users to efficiently and effectively conduct subject matter exchanges.

Two Basic Models of Communication: Post Office or Bulletin Board

By emulating the post office model of communication, email offers an unmatched level of efficiency for basic information sharing tasks (e.g. document distribution) as well as one-touch response tasks such as request for status, request for information, and request for confirmation. On the other hand, by bringing the bulletin board model of communication into an electronic context, newsgroups offers an unmatched level of efficiency for subject matter based information sharing tasks based on communal interest (i.e. a Java newsgroup). With extensions to email to incorporate mailing list distribution capabilities (i.e. a project distribution list), email can provide advantages on par with newsgroups for subject matter based information sharing albeit with the caveat that such an extension can lead to more email clutter.

Other tasks where messaging systems are heavily employed are subject matter exchanges—an effort where two or more parties exchange subject matter expertise often for some mutual benefit. While nothing precludes these exchanges from taking place outside of messaging systems, messaging systems make it possible for the parties to be dispersed and to participate on their own time (time-shifting).

Thread functionality provides support for the "continual conversation", and has been incorporated into both the post office and the bulletin board form of messaging systems. Thread functionality attempts to present to users a set of exchanged messages as a hierarchy of replies. Conventional thread mechanisms have proven so rudimentary that those who choose to engage in subject matter exchanges via conventional messaging systems soon find themselves burdened with an overwhelming number of clerical time-consuming message management tasks.

Electronic bulletin boards typically use threads for the explicit purpose of enabling subject matter exchanges among like-minded electronic communities. With the lack of direct addressing inherent to the bulletin board model of communication, subject matter exchanges often take on a laissez-faire quality that is less than optimal in most workplaces. That is to say that in the workplace, subject matter experts need to directly address who they want to get involved in goal-driven subject matter exchanges—exchanges where two or more parties draw upon each other's subject matter expertise long enough to produce the know-how needed to accomplish a goal or an aspect of a goal.

Conventional electronic mail systems also incorporate thread functionality, and support direct addressing by default. However, to overcome content distribution and addressing challenges, workplace email users rely heavily on distribution lists. As a result, threading with email and extensions for mailing list distribution capabilities take away the direct addressing capability leading to the same laissez-faire qualities of the bulletin board model.

While the notion of threads as a means to preserve context appears to be fundamental to subject matter exchanges, the mechanisms used to realize threading fail to preserve the integrity of the structure of a subject matter exchange. Consequently, in the workplace as subject matter experts primarily rely on email to conduct subject matter exchanges they find themselves also frequently taking on clerical message management tasks: 1) sorting (clustering) messages according to the subject matter exchanges they belong to; and 2) attempting to put the message back into the conversational context (ordering) of the subject matter exchange.

Conventional thread mechanisms in messaging systems are too rudimentary for subject matter exchanges. Notably conventional thread mechanisms are implemented as merely an extension of the message construct. A survey of the prior art illustrates how even those that attempt to address the failings of threads fall into the same trap.

U.S. Pat. No. 5,905,863 (Knowles) teaches that the use of the In-Reply-To field of a conventional email message to construct a message thread is unreliable. Further still, Knowles teaches away from reliance on user inserted structural information to construct threads. Instead, Knowles teaches re-constructing a message thread (automatically) using textual context and characteristics of messages.

In an article entitled "Using Collaborative Filtering To Weave An Information Tapestry", Communications of the ACM, December 1992, Vol. 35, No. 12, p 61–70, David Goldberg discloses an email system which filters (scans) email messages, selects interesting messages and places them in a user's inbox. The email system uses both content based filtering and collaborative filtering. Notably, the system provides the ability to annotate documents in support of moderated newsgroups, and select documents replied to by a given user. The system includes an indexer which reads documents, a document store, an annotation store, a filterer, a document queue (one for each user), and a remailer for periodically forwarding the contents of the document queue to the user via email. The system does not thread documents, but rather provides a framework for storing documents and a query language for interrogating the stored documents to retrieve documents containing desired keywords.

U.S. Pat. No. 6,073,165 (Narasimhan) shows a system for filtering email messages based on user defined filters which forwards select messages to a user's receiver. The system scans email messages to create filtered messages which are forwarded to a device such as a pager used to page a user when a selected email message (determined by filter) arrives.

As evident from the above-listed prior art survey, conventional messaging systems treat threads as a post-processing task from a list of currently available messages. The quality of the produced view relies on the completeness of the available content, i.e. whether the messaging client has access to all the messages, and on the correctness of the available message headers. Hence, the ability of a user to leverage the thread as a means to contribute to the exchange is dramatically impacted by an overburdening process of ensuring access to an accurate and up-to-date view of the exchange.

To overcome such deficiencies, a distinct facility responsible for the thread mechanism is needed to ensure that the structure is accurately maintained as the exchange carries on contribution by contribution.

Furthermore, it is important to observe that the referential information available in conventional message headers only provides relationship information on how a message is a reply to another message and possibly how a message references other messages. This referential information does not suffice in exactly describing the spatial and temporal relationships required to preserve the structural integrity of a subject-matter exchange as well as other relationships representative of user intents while contributing or participating to an exchange. Such complex set of relationships can only be achieved via a coordinate system that preserves the temporal and spatial order of contributions and represents the structure of a subject-matter exchange as a unique construct independent of the content.

Conventional communications systems have fundamentally overlooked the notion that the subject matter exchange and the thread are synonymous and inextricably bound and yet separate and distinct from the subject matter contributed. The inventors of the present invention have learned that preserving the integrity of a subject matter exchange by way of a thread structure requires promoting the thread to an entity in its own right with its own unique identifier. Specifically, in this advanced form the "threading entity" assigns each message its own universal resource identifier (URI). The threading entity ensures that each contribution maintains not just its own identifier but also maintains a reference to the threading entity by recording the entity unique resource identifier so to provide a means to access the structural information in complete detail.

The approach disclosed and claimed herein enables users to trace the flow of an entire subject matter exchange from any point to any point. As used throughout the specification, the advanced notion of a thread is referred to as a dialog. A dialog is synonymous for a subject matter exchange. Each dialog is provided with a universal resource identifier (URI) which may be used to archive, retrieve, and categorize entire subject matter exchanges. The dialog concept and the use of a URI enables the active capture of subject matter exchanges as they occur.

The approach disclosed herein incorporates direct addressing to support goal-driven subject matter exchanges. Notably, the approach blends aspects of the post office model of communication with aspects of the bulletin board model of communication to create an automatic and implicit access control where any party directly addressed during any point of a subject matter exchange gains full access to the entire exchange. Finally, the dialog structuring mechanism captures structural information of the subject matter exchange in detail. As a result, terminal and branch points of the subject matter exchange can be quickly identified providing users with the ability to selectively monitor a more narrow portion of any particular subject matter exchange.

Accordingly, a first object of the present invention is to provide an improved communication system which is fully compatible with conventional messaging systems, and which enables users to conduct subject matter exchanges without manually clustering and ordering each contribution to the exchange.

More particularly, an object of the present invention is to provide a dialog facilitation system that represents and preserves the structural integrity of each subject matter exchange.

Another object of the present invention is to provide a dialog facilitation system which enables users to simultaneously monitor multiple subject matter exchanges.

Another object of the present invention is to provide a dialog facilitation system, which enables users to select the subject matter exchanges and the aspects of subject matter exchanges that they would like to monitor.

Another object of the present invention is to provide a dialog facilitation system, which enables users to search and retrieve an entire subject matter exchange and fully trace the exchange contribution-by-contribution.

Another object of the present invention is to provide a dialog facilitation system, which enables users to apply tags, either at the level ranging from the subject matter exchange itself or at the level of a contribution to the exchange, for the purpose of categorizing and archiving.

Yet another object of the present invention is to provide a dialog facilitation system, which enables users to share a subject matter exchange, or parts thereof, with others who were not participants to the exchange.

SUMMARY OF THE INVENTION

A dialog facilitator is provided which preserves the spatial and temporal context of postings within a given dialog. The postings are packaged into electronic messages having extended header information, and are sent and received using a conventional internet messaging protocols and systems.

The dialog facilitator includes a services gateway for retrieving messages from the conventional messaging system, and uses information contained in the message to populate a dialog posting. The services gateway uses information contained in the dialog posting to generate, for each dialog posting, a posting summary containing a posting identifier, content description information, and referential information identifying relationships to other postings.

A journal keeper receives the posting summary from the services gateway, maps it to the appropriate dialog and stores the summary in the dialog store. The journal keeper examines the referential information to determine whether the posting summary is related to other posting summaries in the dialog store. It assigns a unique dialog identifier to the posting summary if the posting summary is not related to another posting summary, and assigns the dialog identifier of the related posting summary if it is related to another posting summary. The journal keeper updates the referential information of the related posting summaries to reference the newly posted posting summary, and stores the updated referential information in the dialog store.

A media coordinator is provided for graphically depicting the spatial and temporal context of a selected dialog posting in relation to other postings belonging to a given dialog.

According to one embodiment, the dialog facilitator is provided on a server communicating with plural client computers, with the posting summary information being stored on the server, and the dialog postings being stored on the client computers.

According to one aspect of the invention, the journal keeper updates the referential information of the related posting summaries to reference the new posting summary so that the parent posting points to each of the child postings and each child posting points to at least one parent posting, and stores the updated referential information in the dialog store. Moreover, the journal keeper updates the referential information so that siblings point to one another.

According to another aspect of the invention, the media coordinator enables users to navigate between postings belonging to a given dialog, displays the content description information of selected posting summaries, selectively retrieves a chosen dialog posting and displays the posting detail information of the retrieved posting.

According to another aspect of the invention, the media coordinator graphically depicts the spatial and temporal context of a selected dialog posting using a branch (path) structure illustrating how all postings in a given dialog are related to the initial posting either directly or through another posting.

According to yet another aspect of the invention, the media coordinator includes an interface for composing a dialog posting. The interface enables the user to specify whether a posting is a contribution to an existing dialog or is intended to initiate a new dialog. If the posting is a contribution to an existing dialog, the interface enables the user to specify the posting(s) to which the new posting is a response.

BRIEF DESCRIPTION OF DRAWINGS

FIG. 1 is a block diagram showing the dialog facilitation system of the present invention interposed between a user and a conventional messaging system;

FIG. 1A is a block diagram showing a conventional messaging system and its relationship to a user described as either a sender or a recipient of messages;

FIG. 1B is a block diagram showing details of the dialog facilitation system of FIG. 1;

FIG. 1C is a sample Dialog and supporting data model;

FIG. 2 is a block diagram showing the constituent portions of the dialog facilitation system of FIG. 1;

FIG. 3 is a block diagram showing a sample deployment of the dialog facilitation system of FIG. 1;

FIG. 4 is a flowchart of the process for initiating a dialog or contributing to an existing one using the dialog facilitation system of the present invention;

FIG. 5 is a flowchart of the process for providing a path activity summary report (progress assessment) generated using the dialog facilitation system of the present invention;

FIG. 5A is a sample path activity summary report;

FIG. 5B is a sample dialog transcript;

FIG. 5C is a sample path map;

FIG. 6 is a flowchart of the process for handling the update notifications for each of the dialogs of the present invention;

FIG. 7 is a flowchart of the process for retrieving a dialog posting using the dialog facilitation system of the present invention;

FIG. 8 is a flowchart of the process for accessing the transcript and path map artifacts intended to trace a specific dialog;

FIG. 9 is a flowchart of the process for annotating dialogs, paths, and postings managed using the dialog facilitation system of the present invention;

FIG. 10 is a flowchart of the process for a distributing a posting using a conventional messaging system controlled by the dialog facilitation system of the present invention;

FIG. 11 is a flowchart showing how a posting is processed by the dialog facilitation system of the present invention;

FIG. 12 is a flowchart of the process for parsing a message and creating a dialog posting using the dialog facilitation system of the present invention;

FIG. 12A is a flowchart of the process exporting a posting into the format of a conventional messaging system;

FIG. 12B is a block diagram identifying the relationships between the various headers and fields of a conventional email message and a dialog posting;

FIG. 12C is a block diagram showing the format of a dialog posting and a dialog-posting summary according to the present invention;

FIG. 13 is a flowchart of the process storing a posting in the dialog facilitation system of the present invention;

FIG. 14 is a block diagram showing the information stored in the content store and the dialog store; and FIGS. 15A–15D together constitute a flowchart of the process for updating a dialog.

DETAILED DESCRIPTION OF THE PREFERRED EMBODIMENT

Figure 1D:
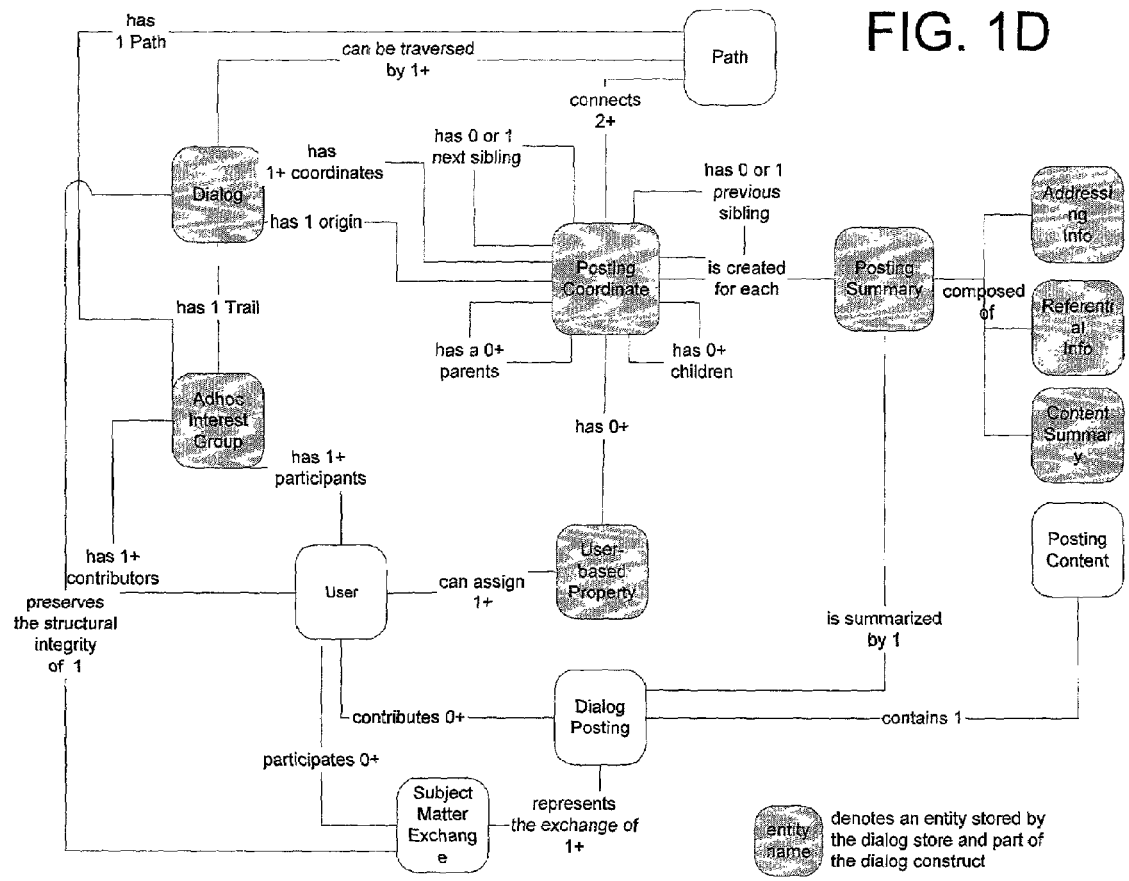
FIG. 1D is a block diagram of structural information maintained by each posting summary to create a path.

The following terms and definitions are used throughout this specification:

DIALOG refers to a construct that describes the structure of a subject-matter exchange conducted over conventional messaging systems.

DIALOG FACILITATION SYSTEM refers to the system implementing the proposed objects and methods of the disclosed invention.

DIALOG POSTING refers to the contribution made by a user to an existing or a newly initiated dialog. A dialog posting that initiates a dialog is referred to as the origin dialog posting.

POSTING SUMMARY refers to the set of addressing and referential information contained in a dialog posting and used by the dialog facilitation system to update a dialog.

POSTING COORDINATE refers to the set of temporal and spatial relationships uniquely assigned to each dialog posting as a result of the mapping process. The coordinate of the origin dialog posting that initiated the dialog is referred to as the origin posting coordinate.

REFERENTIAL INFORMATION refers to the set of information carried by a dialog posting to communicate its relationship to another posting at the posting, content, and user intent levels.

ADDRESSING INFORMATION refers to the set of information carried by a dialog posting to communicate the identity of the contributor, target participants, and other ad-hoc interest groups.

PATH refers to the unique set of two or more coordinates that connect two dialog postings within a dialog.

DIALOG AD-HOC INTEREST GROUP refers to the set of contributors and participants currently engaged in a subject-matter exchange.

PATH AD-HOC INTEREST GROUP is a subset of the DIALOG AD-HOC INTEREST GROUP, and refers to the set of contributors and participants currently engaged on a select path of the subject-matter exchange.

TRANSCRIPT refers to a report generated by the dialog facilitation system containing posting summary information for all postings on a path between a selected posting and the origin posting that initiated the dialog.

PATH MAP refers to a visual representation of a transcript enhanced by visual indications designed to support the navigation of a dialog.

CONTRIBUTOR refers to a user that initiates or contributes to an existing dialog via a dialog posting or a markup action.

PARTICIPANT refers to a user involved in a dialog as a result of a contribution (posting) that identifies the user within the posting addressing information.

CONVENTIONAL MESSAGING SYSTEM refers to text and voice based electronic communication systems facilitating asynchronous message exchanges among two or more users.

POSTING PROPERTIES refers to dialog, path or posting properties created and managed by the system.

USER-BASED PROPERTIES refer to dialog, path or posting properties created and assigned by a user. Some properties can be shared among users.

INITIATE refers to the user action whereby a user initiates a dialog via newly submitted dialog posting.

CONTRIBUTE refers to the user action whereby a user submit a dialog posting as a response to one or more dialog postings of an ongoing dialog.

MARKUP refers to the user action whereby a user specifies a user-based property to be assigned to a dialog, path or posting.

MONITOR refers to the user action whereby a user assesses the latest activity on a specific path on an ongoing dialog.

TRACE refers to the users action whereby a user retrieves transcript and path map so to re-contextualize an ongoing dialog.

RETRIEVE refers to the user action whereby a user retrieves the content of a selected dialog posting.

SERVICES GATEWAY refers to a module of the dialog facilitation system responsible for mediating access to supporting network-based services.

JOURNAL KEEPER refers to a module of the dialog facilitation system responsible for mapping dialog postings to dialog constructs.

MEDIA COORDINATOR refers to a module of the dialog facilitation system responsible for processing user requests and presenting results.

DIALOG STORE refers to the storage subsystem responsible for storing the structure and optionally the content of a of a subject-matter exchange.

CONTENT STORE refers to the storage subsystem responsible for storing the content of a subject-matter exchange. According to a preferred embodiment, the CONTENT STORE is physically located within the conventional messaging system.

The dialog facilitation system of the present invention promotes the thread to an entity of its own—a dialog. The dialog includes a coordinate system which it uses to capture the structural information required to preserve the integrity of a subject-matter exchange. The dialog facilitation system enables users to trace the flow of an entire subject-matter exchange from any point to any point. The dialog facilitation system uses a construct termed a "dialog" which enables users to archive, retrieve, and label an exchange or any part of it.

System Overview

FIG. 1 is a block diagram showing the dialog facilitation system of the present invention, generally designated 100, interposed between a user 102 and a conventional messaging system 104.

The dialog facilitation system 100 includes an interface enabling users to initiate, contribute, mark-up, retrieve, monitor and trace any dialog. The dialog facilitation system 100 maintains a dialog store 100-1 used to store the dialog construct (posting summary and other data used by the dialog facilitation system), and leverages the services provided by a conventional messaging system 104 to distribute, deliver, and store contributions to the dialog which contributions are termed postings.

As will be explain below, a dialog according to the present invention uses a framework or construct to provide a variety of enhanced services including preserving the contextual and temporal relationships of each contribution (posting) to the dialog, monitoring and navigating a dialog, and sharing a dialog or portion thereof. According to a presently preferred embodiment, the dialog construct is stored locally within the dialog facilitation system 100, whereas the dialog posting, i.e., the content of the contributions to the dialog, are stored on the conventional messaging system 104. However, one of ordinary skill in the art will readily appreciate that format, manner and location of storing the dialog construct and postings may be altered without affecting the functionality of the present invention.

Leveraging of the Conventional Messaging System

FIG. 1A is a conceptual block diagram of a conventional messaging system 104 used to communicate email between a sender and a recipient. As is known in the art, the conventional messaging system 104 includes a message transfer agent 104-2, a message delivery agent 104-3 and a message store 104-4 for a user's inbox 104-5 and plural user folders 104-6.

The dialog facilitation system 100 leverages the conventional messaging system 104 to distribute, deliver, and store the exchanged dialog postings. The message transfer agent 104-2 provides distribution services. A newly contributed dialog posting is packaged into an email message for distribution to other users. The message delivery agent 104-3 provides delivery services. Received messages are delivered to the user inbox 104-5, and the extracted postings are subsequently stored in the message store 104-4 after having been processed by the dialog facilitation system 100.

Basic User Model for the Dialog Facilitation System

FIG. 1B is a conceptual block diagram showing the dialog facilitation system 100 of the present invention used to facilitate a dialog between a contributor and a participant of a dialog.

The dialog facilitation system 100 allows either user 102 (contributor or participant) to initiate a new dialog, contribute to an existing one, monitor the progress of a dialog, trace a given branch (path) of the dialog, and retrieve dialog postings.

As will be explained below, postings are packaged into conventional email messages which are then transported to each dialog participant via the conventional messaging system 104. The received (email) messages are processed into postings which are either added to an existing dialog or inserted into a new dialog.

The dialog construct preserves the spatial and temporal order of individual posting(s) by assigning a unique posting coordinate to each posting and storing referential information linking each posting coordinate with related posting coordinates. The relationship between postings may be established as a result of time ordering (e.g. posting E was contributed before posting F but after posting D), posting position (e.g. postings B and C were contributed in response to posting A), or as a result of user-to-system interactions. See FIG. 1C. For example, a user may annotate a posting with a particular tag to reflect a state read/unread/reacted.

To support tracing and monitoring of a dialog, the dialog facilitation system 100 uses the structural information maintained by each posting summary to create a path (i.e. A->D->E->F) so to convey structural and temporal information and support the re-contextualization of a portion of an exchange. See FIG. 1D. The path connects two or more posting summaries, and is characterized by a Path Ad-Hoc Interest Group that identifies the set of contributors and participants that have engaged in a specific portion of the exchange. The addressing information contained in each posting summary provides a record of the intended direct (to) and indirect (cc) posting audience. The set of users extracted from each addressing information section of each posting summary contained in a path makes up what is referred to as a Path Ad-Hoc Interest Group and is used by the dialog facilitation system to control access and sharing requests.

Distributed Storage Model

According to the presently preferred embodiment, the dialog facilitation system 100 uses a distributed storage model in which the dialog construct, which preserves the temporal and contextual characteristics of the postings, is stored by the dialog facilitation system 100 in the dialog store (storage area) 100-1, and the posting content is stored by the conventional messaging system 104 in a mail folder 104-6 within the content store 104-4. See, FIGS. 1, 1A, 1B, and 14. In other words, the dialog construct is a distinct entity from the posting content.

The dialog facilitation system 100 creates and manages the folders 104-6 within the conventional messaging system 104 using well known Internet messaging protocols and standards. The postings are retrieved by the dialog facilitation system 100 when the user requests access to the dialog content.

The distributed storage model not only facilitates a flexible and secure distribution of the dialog content across a network, but also enables the user to access the postings as conventional email messages in the event where the user does not have access to the dialog facilitation system 100.

FIG. 3 illustrates how the dialog facilitation system 100 may be deployed across user premises 320 and a service provider premises 322. Within the user premises 320, the system 100 is deployed on the user's desktop 300 as either a stand-alone client 100-*a* or as a plug-in component 100-*b* to a conventional email client. A dialog facilitation system proxy 302, also deployed on a user desktop 300, provides for the access to conventional messaging system services 104 as well as secure access to a dialog storage server 324. It is important to note that the proxy component 302 could also be deployed on another available intranet host computer such as the conventional messaging system host 104. Furthermore, the proxy component 302 provides support for synchronization of dialogs to other devices like a palmtop device.

The dialog facilitation system server 324 and dialog store 100-1 components are deployed within the service provider premises 322. Mobile users of the dialog facilitation system 100 can connect to the service provider premises 322 to access monitoring and tracing functionality while away from the desktop 300.

FIG. 2 is a block diagram showing the constituent portions of the dialog facilitation system 100. As shown in FIG. 2, the dialog facilitation system 100 includes a services gateway 106, a journal keeper 108, and a media coordinator 110.

The services gateway 106 is responsible for locating and mediating access to services offered by conventional messaging system 104. The services gateway 106 locates, establishes and maintains connectivity to various network services (i.e. messaging transfer agent, message delivery agent, file transfer services, directory services, calendaring services, content management services, etc.); and provides mechanisms for converting data exchanged using the dialog facilitation system 100 data model.

The journal keeper 108 is responsible for maintaining a contextual record of each posting contributed to a dialog. Specifically, the journal keeper 108 provides a way for mapping individual dialog postings to a dialog. Further, the journal keeper 108 provides a way for inspecting and updating the dialog store and for distributing dialog notification updates. Dialog notification updates result from napping postings to dialogs or from updates resulting from processing markups and tags contributed by users to dialogs, paths, or postings.

As will be explained below, the media coordinator 10 generates the various "artifacts" (path maps, transcripts, and path activity summary reports) that enable the user to monitor and trace dialogs.

As depicted in FIG. 2, a user 102 of the dialog facilitation system 100 interacts with the media coordinator 110 in order to initiate a new dialog, contribute to an existing dialog, retrieve a specific dialog posting, or retrieve the artifacts like path maps, transcripts, and path activity summary report that enable the user to monitor and trace dialogs.

As shown in FIG. 12C, each dialog posting 1200 includes addressing information 1202, referential information 1204 and posting detail 1206. The addressing information contains a list of ad-hoc interest group participants to whom the posting is addressed.

As will be explained below in further detail, each dialog is identified by a dialog identifier, and each posting within a given dialog is provided a unique identifier (URI).

The referential information contains the URI of the dialog, the URI of the current posting, and the URI of other postings to which the current posting is related.

Optionally, the posting may include detailed referential information which identifies the particular portions of the posting(s) which the current posting is addressing (e.g. third paragraph of posting A).

Also, the posting may include more specific referential information which identifies the intent of the posting to be submitted. For example, a posting may indicate that the intent of the user is to identify an issue within the current subject-matter exchange.

FIG. 12B is a block diagram providing details of the addressing and referential information. Notably, the addressing information contains the email addresses of the sender and each of the recipients. The referential information 1204 includes a message ID (used because of its guaranteed uniqueness within conventional messaging systems), an In-Reply-To field identifying correspondence that this message answers, and a References field identifying correspondence that this message references (all fields containing ids of previously contributed postings by either users of the dialog facilitation system or of conventional messaging systems). Importantly, the referential information also includes extended header information such as X-Trail-ID which contains an identifier of the dialog, X-Parent IDs which contains the identifiers of postings that the present posting refers to, and X-Component which contains the identifiers of sections of content from referenced postings that this posting responds to.

As further shown in FIG. 12C, each posting summary 1208 includes addressing information 1210, referential information 1212, and content description 1214. As will be explained, the media coordinator 110 uses the posting summary information 1208 to construct path maps and the like.

The dialog posting 1200 is shared with other dialog participants by the conventional messaging system 104. Notably, the services gateway 106 exports a newly contributed dialog posting 1200 into the protocol format native to the conventional messaging system 104 (e.g. email message). The dialog facilitation system 100 packages postings into conventional email messages which are subsequently transmitted by the conventional messaging system 104. As part of the packaging process, the services gateway 106 must populate the standard and extended header fields shown in FIG. 12B. The conventional messaging system 104 uses the standard addressing fields to route the posting to each of the specified participants and deliver it to the participant's inbox 104-5 (FIG. 1A). The extended header fields contain information used by the recipient dialog facilitation system 100 in updating the appropriate dialog.

The process of initiating a dialog or contributing a posting to an existing dialog begins when the user issues either the command for a new dialog posting or the command to react to an existing dialog posting. Both commands result in the composition by the user of a dialog posting.

FIG. 4 is a flow diagram of the process for contributing a posting to either a new or an existing dialog.

The process starts with the user issuing a command specifying initiation of a new posting or contribution to an existing dialog (step 400). If the user elects to contribute a posting to an existing dialog, then the system will record the dialog and posting identifiers of the posting(s) to which the user is responding (step 402). The system 100 uses this information in setting the referential information (FIG. 12B) of the pending dialog posting with the identifiers of the referred postings.

Optionally, users may "drill down" and specify one or more content parts of one or more existing dialog postings to which the user is responding (step 404). For example, a given posting may address a single issue from among a list of issues discussed in a prior posting. The user specifies the content parts by providing the start and end points of each referred content part. The system 100 uses this information in setting the referential information (FIG. 12B) of the pending dialog posting with the identifiers of the referred postings.

Next, the journal keeper 108 resolves the list of participants in the path and dialog ad-hoc interest group (step 406) from the posting ID(s) identified in step 402.

Using the path ad-hoc interest group from the previous step, the media coordinator 108 populates the "to" and "carbon copy (cc)" posting addresses. Using the dialog ad-hoc interest group, the media coordinator populates the "blind carbon copy (bcc)" posting addresses (step 408).

If desired, the ad-hoc interest group may be extended by adding additional participants (recipients) (step 410).

If the user signals a desire to add additional participants (in step 410), or initiate a new dialog (in step 400), the system prompts the user to provide the necessary addressing information (step 414).

The user specifies a content description for the dialog posting and composes the content for the dialog posting (step 416) much like in any other conventional messaging systems. The user may also specify the intent of the posting as a whole or a specific section of content. The user optionally specifies the documents to include as attachments for the dialog posting (step 418). Finally, the user submits the newly created posting (step 420), triggering the services gateway 106 to distribute the dialog posting to the specified participants (step 422).

FIG. 12A is a flowchart of the process for exporting a posting for transport by the messaging system.

The services gateway 106 receives the dialog posting and creates an instance of an email message (step 340). Next the services gateway 106 extracts the addressing information from the posting and populates the email addressing information (step 342), and extracts the content description to populate the subject header field (step 344).

Next, the services gateway 106 populates the extended header information (FIG. 12B) using the dialog identifier, parent posting identifier and other referential information (step 346), and populates the message body with the dialog content (step 348).

Finally, the posting attachment information (if any) is used to populate the attachment section of the email message (step 350).

Processing New Dialog Contributions

FIG. 11 is a flowchart showing the steps involved in processing communications transported by the conventional messaging system into postings.

As noted previously, dialog postings are transported by the conventional messaging system 104. The services gateway 106 periodically connects to the conventional messaging system 104 to detect the presence of new messages (step 230). The process is triggered by a request to check for new contributions, which the services gateway 106 autonomously generates in accordance with a user-configurable schedule, or an explicit request from the user.

Using protocols specific to the service type (e.g. POP or IMAP), the services gateway 106 retrieves the headers of all messages flagged as "new" (step 232). Each message header is examined by the services gateway 106 to determine whether the message contains referential information (step 234). If so, the message is imported into a posting (step 238). Otherwise, the services gateway 106 determines whether the message was sent from an address or domain which the recipient has excluded from the dialog facilitation system (the "skip list"; step 236). If not, i.e., the message does not contain referential information and was not excluded by the recipient, then the message is imported into a posting (step 238).

Each retrieved message is imported by the services gateway 106 from the native format of the delivery service provider (email) to the dialog posting format (step 238). More particularly, the services gateway 106 populates the addressing information 1202 and referential information 1204 from the corresponding fields in the message header (FIG. 12B), and generates the posting summary 1208 (FIG. 12C) (step 240).

Next, the services gateway 106 requests the journal keeper 108 to update the dialog with the generated posting summary (step 242). The services gateway 106 updates the referential information of the posting with the dialog identifier returned by the journal keeper 108 (step 244). Finally, the services gateway 106 passes the posting content to the conventional messaging system 104 for storage in the content store 104-4 (step 246).

FIG. 12 is a flowchart of the process for importing a posting from an email message.

The services gateway 106 receives the message containing the dialog posting and creates an instance of a dialog posting and an instance of a posting summary (step 260). Next the services gateway 106 populates the posting addressing information (step 262) and the referential information (step 264) of the posting and posting summary from the corresponding fields in the message.

The extended header information (FIG. 12B) is examined to determine if it references a dialog (step 266). If it does, the extended header information (X-Trail-Id, X-Parent-ID, X-intent, and X-Component) is used to populate the referential information of the dialog posting (step 268).

Next the services gateway 106 extracts the message body and populates the posting content (step 270).

Finally, the attachment information (if present) is used to populate the attachment section of the dialog posting (step 272).

The services gateway 106 forwards the dialog-posting summary to the journal keeper 108 which in turn maps the posting summary to the appropriate dialog.

To support a strict security model, the services gateway 106 retains the message content of the dialog postings within the user premises 320 (FIG. 3) and uses standard Internet security practices (encryption and SSL) to exchange the information with the journal keeper 108. However, the system 100 may be readily adapted to echo the complete dialog posting to the journal keeper 108 where it will be safely stored for a period of time specified by the user.

The availability of the complete dialog posting within the journal keeper 108 enables a user to retrieve content while away from the corporate premises. In response to the update request, the journal keeper 108 returns to the services gateway 106 the dialog identifier of the dialog to which the contribution was posted. In turn, the services gateway 106 updates the referential information of the posting to include the dialog identifier.

As noted previously, the posting content is stored in the content store 104-4. The content store (when hosted by a conventional messaging system) provides the ability to store and retrieve email messages in a folder structure 104 managed by the dialog facilitation system 100 using IMAP or POP protocols. However, the system 100 can alternatively store the dialog postings on the user's desktop or remotely within a third-party services network premises.

According to the former storage scenario, the services gateway 106 simply manages a local user-designated storage area much like the conventional messaging system's client (email reader). According to the latter storage scenario, the services gateway 106 stores the dialog postings within a user-designated extranet offering content storage services via the IMAP protocol. As described previously, the content of each processed dialog posting is stored in the content store 104-4 (FIGS. 1, 3).

As described above, the services gateway 106 exports the posting to the native format of the storage provider (email message) before storing the dialog posting in the content store 104-4 of the conventional messaging system.

FIG. 13 is a flowchart of the process for storing posting content.

Once the posting has been exported to the native format of the storage provider, the services gateway 106 establishes a session with the conventional messaging system 104 (step 250). The services gateway 106 extracts the dialog ID (URI) from the posting (step 252), and translates it to yield the name of the folder 104-6 (FIG. 1B) in which the posting content will be stored (step 254).

Next, the services gateway interrogates the messaging system 104 to determine whether the folder 104-6 exists in the content store 104-4 (step 256). If the folder 104-6 does not exist, the services gateway 106 instructs the messaging system 104 to create the folder 104-6 (step 258). Otherwise, the services gateway 106 simply requests the messaging system 104 to store the exported posting (step 260).

Referring back to step 272 of FIG. 12, once the received message has been processed into a posting by the services gateway 106, the posting summary is forwarded to the journal keeper 108 in order to update the dialog.

Figure 15B:
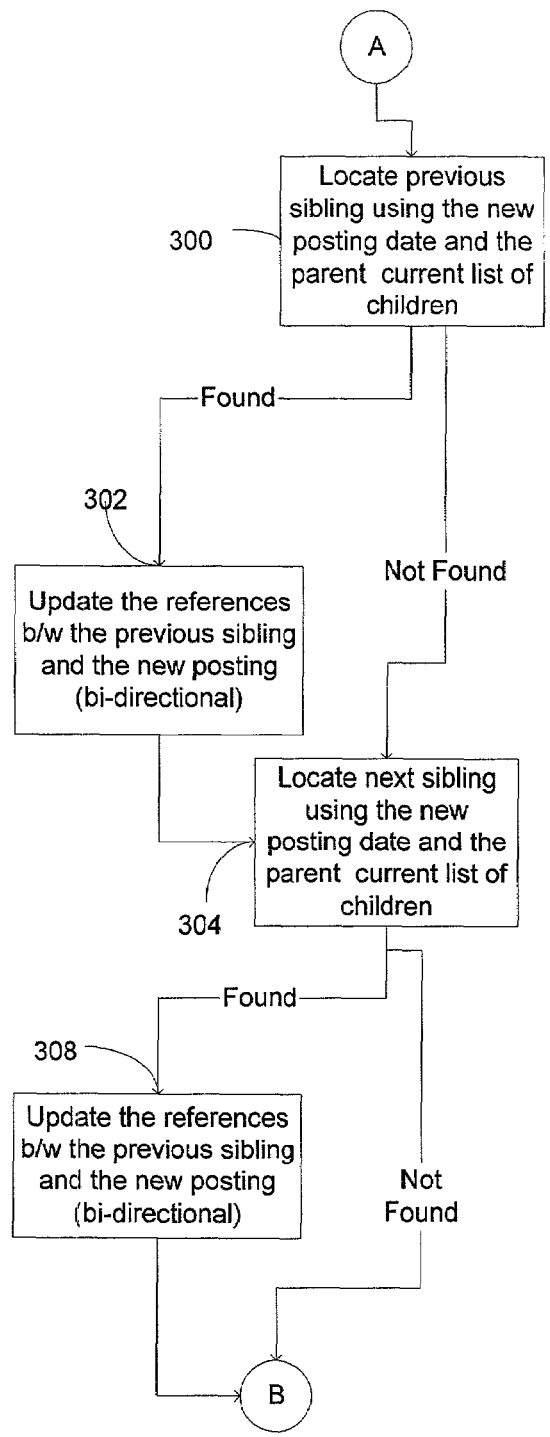
Figures 15C, 15D:
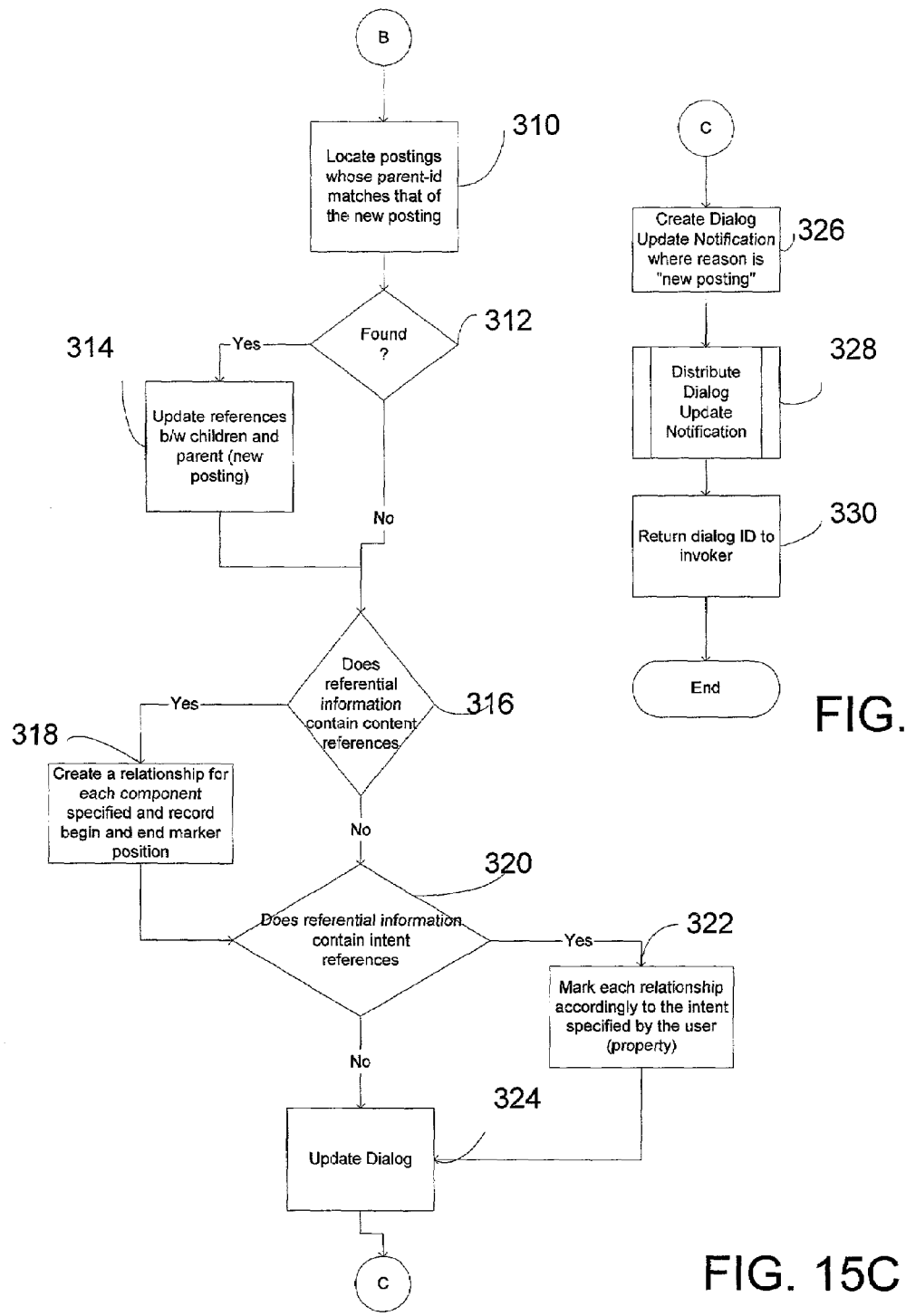

FIG. 15 is a flow diagram of the mapping process performed by the journal keeper 108. The journal keeper 108 receives the request to update a dialog posting from the services gateway 106 (step 280), which includes the posting summary.

The journal keeper 108 examines the referential information contained in the posting summary to determine whether it contains any X-Trail and X-Parent ID information (FIG. 12B) (step 282).

If the referential information does not contain extended header information (e.g. X-Trail information), then the journal keeper 108 examines whether the referential information contains Reply-To information (step 284), and searches for a corresponding posting (a posting with a message id referenced in the reply-to information) (step 290). Otherwise, if the referential information does not contain Reply-To information then the journal keeper 108 generates a new dialog ID (URI) (step 286), generates a new dialog posting and posting summary (step 288) and adds the posting summary to the dialog (step 294).

Referring back to step 282, if the referential information contains X-Trail information, then the journal keeper attempts to inspect the referenced dialog (step 290). If the dialog is located, then the posting summary is added to the dialog construct as a result of the mapping process (step 294). Otherwise, processing will revert to steps 286 and 288.

Each time the journal keeper 108 creates a dialog or updates an existing one, the journal keeper 108 creates an update notification. The update notification indicates, among other things, a "reason" field which identifies action information regarding the posting. For example, if the posting is the first posting (root) of the dialog (step 296) then the "reason" field is set to "new posting (step 326, FIG. 15D). The dialog update notification is then distributed to the dialog ad-hoc interest group (step 328), and the dialog ID (URI) is returned to the services gateway 106 (step 330).

In step 296 (FIG. 15A), if the posting is not the first entry in the dialog, then the journal keeper 108 locates the parent posting(s) and updates child relationships of the parent postings (step 298). In other words, the posting identifier information is added to the referential information of each of the parent postings to provide a two-way link between the parent and the child posting. The parent points to the child and the child points to the parent. As will be discussed below, the two-way link is used to navigate between postings.

Next, the referential information contained in each of the siblings of the newly mapped posting is updated to provide a two-way link between the sibling and the newly mapped posting (steps 300–314).

More particularly. posting siblings are located by examining the child postings contained in the referential information of the parent posting (step 300). The referential information of each sibling then updated to reflect the new posting (steps 302–314).

Next, the referential information of the posting is examined to determined whether it contains "content references", i.e. references a particular portion (component) portion of a given posting (step 316). If so, the journal keeper 108 creates a relationship for each component, recording the starting and ending position of the component (step 318).

Similarly, the referential information of the posting is examined to determined whether it contains "intent" references (step 320). If so, the journal keeper 108 creates a relationship according to the intent specified by the user (step 322).

The mapping of the posting positions the posting in relation to other dialog postings within the dialog (steps 280–298). Moreover, the mapping ensures that the relationships reflect possible user-specified content-level linkages between the related postings (steps 300–314). Finally, the mapping annotates the relationships to reflect possible system-to-user interactions (for example a user tagged a message as "read").

At completion of the mapping process, the journal keeper 108 will return to the services gateway 106 the dialog identifier assigned (URI) to the newly processed dialog posting as well as generate a dialog update notification that will reflect the updates performed by the journal keeper 108 onto the dialog store throughout the process.

As described above, the services gateway 106 uses the Universal Resource Identifier (URI) to construct the name of the folder 104-6 (FIG. 1A) used to store the posting content. Notably, the services gateway 106 uses the services of the conventional messaging system 104, offered via Internet messaging standards (IMAP), to locate (and if necessary create) the folder 104-6 used to store the dialog content.

It should be noted that the services gateway 106 manages storage and retrieval of the posting content, whereas the journal keeper 108 manages storage, retrieval, and processing of the dialog and posting summaries. See, e.g., FIG. 13A.

The journal keeper 108 distributes the dialog update notifications to all the dialog participants (ad-hoc group) that elect to maintain active interest in ongoing dialog. As noted above, users may suppress a given path, thereby indicating that they are not interested in monitoring the path. For example, a user who is not interested in a specific conversation path can markup a dialog path to specify a "suppress" state on a dialog posting. As a result, the journal keeper 108 will not distribute to the user updates for the suppressed path.

Receiving Dialog Update Notifications

FIG. 6 is a flowchart of the dialog update process.

The dialog update process begins when the media coordinator 110 receives a dialog update notification record from the journal keeper 108 (step 360). The media coordinator 110 compares the dialog identifier (URI) of the dialog update notification record against the list of currently monitored dialogs contained in the dialog monitor abstraction to determine if the dialog is currently being monitored (step 362). If not, then the media coordinator 110 adds the new dialog ID to the list of currently monitored dialogs (step 364), caches the new posting summary in the dialog monitor abstraction (step 368), and requests the journal keeper to mark the state of the posting to "unread" for the user. (step 372).

If the media coordinator 110 is already tracking the dialog then the media coordinator determines whether the received dialog posting summary has already been cached (step 363). If not, then the media coordinator 110 validates whether the parent posting has been cached (step 366).

If the parent posting has not been cached (in step 366), then the media coordinator 110 caches the new posting summary as the most recent posting activity for this dialog (step 368), and sets the posting summary state to "unread" (step 372).

If the parent posting has been cached (in step 366), then the media coordinator 110 replaces the parent posting summary with the new posting summary (step 370), and sets the posting summary state to "unread" (step 372).

The media coordinator 110 (FIG. 2) processes and accumulates the dialog update notifications for each dialog so that the latest activity on each dialog can be readily known. Upon request from a user, the media coordinator 110 will produce a path activity summary report (FIG. 5A). This artifact is intended to aid the user in monitoring the dialogs for which he or she has elected to participate. As will be explained below, the media coordinator 110 may also be used to generate a dialog transcript (FIG. 5B) or a path map (FIG. 5C).

Path Activity Report

As noted above, the media coordinator 110 manages a list of dialog identifiers for the dialogs for which the user participates (collectively referred to as a dialog monitor abstraction). The dialog monitor abstraction is used to build and render the path activity summary report (FIG. 5A). The path activity summary report is initially created when the user first launches the media coordinator 110 and requests the content of the dialog monitor, and is subsequently refreshed when the user issues a "refresh" request.

The media coordinator 110 maintains, for each of the dialog identifiers in the dialog monitor abstraction, the dialog posting summary of the most recent posting in the currently monitored dialog paths. The dialog monitor abstraction further includes a dialog update notification record which consists of a unique dialog resource identifier, an update reason that describes the reason for the update (new posting, update posting state), and the posting summary.

As described above, the dialog posting summary consists of a preview of the content of the posting, the author, a participant recipient list, and a number of user-based properties that to track information such as has the user read the posting.

The media coordinator 110 maintains additional user-based properties to organize and stylize the path activity summary report according to user preferences.

FIG. 5 is a flowchart of the process for generating a path activity summary report.

The user initiates the request to generate the path activity summary report (step 500). For each monitored dialog, the media coordinator 110 requests the journal keeper 108 to retrieve the postings summaries including the user-based posting properties (step 502).

The media coordinator 110 uses the retrieved posting summaries and user-based posting properties to build the path activity summary report (step 504), stylizes the report according to the current access device (step 506), and renders the report (step 508).

The path activity summary report (FIG. 5A) enables users to trace each dialog as it provides entry points (the posting summaries) to the latest contribution on each path of each dialog currently monitored by a user. Moreover, any posting summary may be used to retrieve other artifacts designed to aid the user in re-contextualizing a dialog like the path map, transcripts, and postings. Each artifact (path activity summary report, dialog transcript, and path map) created by the media coordinator is designed to help the user view the exchange as it occurred posting by posting so to recreate its context.

The media coordinator 110 may also be used to create a transcript (FIG. 5B) or a path map (FIG. 5C).

FIG. 8 is a flow diagram of the process for retrieving a transcript or path map.

Each time the user issues a request for the transcript and path map of a particular posting (step 800), the media coordinator 110 sends a request to the journal keeper 108 to determine the path of postings connecting the requested posting to the original (root) posting of the dialog (step 802). Moreover, the media coordinator 110 requests the journal keeper 108 to retrieve the posting summaries and user-based properties of each of the dialog postings along the path (step 804).

The media coordinator 110 builds the transcript (FIG. 5B) and the path map (FIG. 5C) by combining the set of posting summaries and properties obtained from the journal keeper 108 (step 806). The media coordinator 110 stylizes the transcript and path map according to the user's current access device and properties (step 808). For example, a graphic intensive representation of a path map rendered on a desktop is not necessarily provided when rendering on a palmtop. Also, the availability of user properties may result in a visual representation of a posting that reflects the state (read/unread, reacted). Finally, the media coordinator 110 renders the transcript (step 810).

FIG. 7 is a flowchart of the process for retrieving a dialog posting.

Users request access to a dialog posting via the media coordinator 110 (step 700). In turn, the media coordinator 110 issues a request to the journal keeper 108 to retrieve the dialog posting summary and user-based posting properties for the specified posting (step 702). The media coordinator 110 further issues a request to the services gateway 106 to retrieve the content of the specified dialog posting (step 704), and then merges the posting summary, the user-based posting properties, and the posting content into one document (step 706).

Next the media coordinator 110 stylizes the document in accordance with the capabilities of the user access device (step 708) and renders the document (step 710).

The media coordinator 110 also facilitates the markup by the user of any of the artifacts (path map, transcript, dialog posting, and summary report). For example, a user may choose to tag a specific location within a path map to recall the posting at a later time. Markup of an artifact will produce an annotation represented as a user-based property. General user-to-system interactions like retrieving a dialog posting will produce user-based properties that reflect the fact that the user has "read" the posting. However, other interactions like suppressing, tagging, placing a posting on hold will also result in user-based properties. The suppress properties specifies that the user is no longer interested in actively monitoring the dialog or path for the selected posting. The on-hold property allows to specify that a posting should be retrievable from the "on-hold" area (much like a bookmark). The tagging of a posting results in the assignment of a user-specified tag to the posting. The tag will later be used as a means to refine find requests. These properties are stored by the journal keeper 108 and are used by the system 100 during the mapping process as well as the during the production of current and future artifacts identified as essential to the monitoring and tracing of dialogs.

FIG. 9 is a flowchart of the posting markup process.

The media coordinator 110 facilitates the markup of dialog postings, and prompts the user to specify a markup action such as tag, suppress, etc. (step 900) In response to the markup request, the media coordinator 110 maps the markup action to one or more dialog postings (step 902), and requests the journal keeper 108 to update the dialog, posting or path properties (step 904).

According to another aspect of the invention, the media coordinator 110 enables a user to share a posting, path (series of postings) or a complete dialog with a user who is not currently involved, i.e., is not part of the ad-hoc interest group. This is similar in concept to forwarding a whole series of topical email to someone (assuming that a single user may have access to the complete exchange). The share request is communicated as a markup action on a user-specified dialog posting, and results in the distribution of the shared contribution to the newly invited user.

The user initiating the sharing request specifies the posting identifier of the posting(s) to be shared and the sharing level (share path or entire dialog). The request for sharing is received by the media coordinator 110 as a markup action. As a result of the request, the media coordinator 110 instructs the services gateway 106 to retrieve the dialog posting for the provided identifier, and requests distribution of the posting to the newly invited user(s).

The user may (optionally) specify a sharing level, which defines the recipient's access to portions of the dialog. For example, a single posting may be shared, all of the postings along a given path may be shared, or access to the entire dialog may be provided to the recipient.

The share-level request "dialog" or "path" is added to the posting summary as a user intent. The addresses of the invited users are also added to the "to" section of the addressing information within the posting summary. The posting summary together with the posting content is assembled into a complete dialog posting ready to be distributed. Finally, the media coordinator 110 requests the services gateway 106 to distribute the dialog posting to the invited users.

The shared dialog posting will be processed for the new user like any other received dialog postings. However, access to the content of other dialog postings contained in the shared path or dialog will not occur until the newly invited user requests access to the posting content. In other words, the system 100 will not incur the overhead of transmitting the content of each of the postings unless and until the recipient indicates an interest in reviewing a given posting. At that time, the services gateway 106 of the newly invited user will contact other peer gateways 106 for participants listed in the path ad-hoc interest group and request a copy of the content. The retrieved posting content will be then presented to the user and also stored locally in the user-specific content store for future access.

FIG. 10 is a flowchart of the process for distributing a posting.

In response to a distribution request, the media coordinator 110 (via the services gateway 106) verifies that the requested posting is available (valid) (step 1000).

The services gateway 106 retrieves the contributor user profile to resolve the type and address of the service provider (step 1010) (e.g. FTP or SMTP service available at address smtp.corp.com).

If the service provider is a conventional messaging system, the services gateway 106 exports the dialog posting to the native format (email) of the service provider (step 1020), establishes a session with the conventional messaging system (step 1030), and requests the messaging system to distribute the posting as an email message (step 1040).

Alternatively, the services gateway 106 exports the dialog posting to the native format of the service provider (step 1050), establishes a session with the service provider (step 1060), and requests the service provider to distribute the posting as a native construct (step 1070).

Retrieving a Dialog Posting

Users assess the progress of a dialog by reading (fetching) the content of dialog postings.

Each time the user issues a request to fetch a dialog posting, the media coordinator 110 sends a request to the journal keeper 108 to retrieve the dialog posting summary and the user-based posting properties for the specified posting. More particularly, the media coordinator 110 sends a request to the services gateway 106 to fetch the content detail of the specified dialog posting from the content store 104-4. The media coordinator 110 builds a dialog posting document that combines the dialog posting summary (including the user-based posting properties) and the content detail received from the services gateway 106. The media coordinator 110 stylizes the dialog posting document according to the user's current access device (e.g., PDA vs. desktop) and the user properties specific for that posting. The media coordinator 110 completes this process by rendering the dialog posting.

Issuing a Posting Distribution Service Request

Newly contributed dialog postings are distributed to each of the listed (ad-hoc) participants by the services gateway 106 via a distribution service provider such as the message transfer agent (MTA) 104-2 (FIG. 1A) of the conventional messaging system 104.

In a hybrid distribution network, where different service providers are used to deliver dialog postings to the participants, the services gateway 106 relies on a central service profile and address directory to determine the service type, locality, and configuration of the user-designated distribution service provider. For example, the service profile may contain information on the SMTP service used to distribute posting via the conventional messaging system 104. Such information includes the service address, the service access control information like user name and password, and service specific properties like support for security.

The service type information enables the services gateway 106 to determine which user-addressing model will be used. For example, an SMTP service will require the use of email like addresses (e.g., username@corp.com) to properly deliver the dialog posting to each participant. However, a different service provider, like FTP, may require the computer Internet address (hostname or IP address) to which deliver the dialog posting.

Establishing a Distribution Service Provider Session

Before distributing the dialog posting, the services gateway 106 verifies whether the addressing information has been provided. Moreover, the services gateway 106 accesses the contributor's user profile and retrieves service profile information such as the address of the SMTP service provider. Using the SMTP service provider address, the services gateway 106 establishes a session with the service provider 104-2 indicated as a conventional messaging system using well-known protocols, such as the RFC822 protocol.

After the session is established with the service provider 104-2, the services gateway 106 exports the dialog posting in the native format of the distribution service provider. According to the presently preferred embodiment, dialog postings are packaged into conventional email messages complying with the requisite protocols such as the RFC822 and RFC2045–2049 standards. The addressing information of the dialog posting is used to populate the addressing sections of the email message header.

The content description field of the dialog posting is exported to the message subject header field. The dialog posting content (including attachments) is exported to the email message body using a MIME multi-part format such as is well known in the art.

To ensure proper handling of the dialog posting, it is necessary to ensure that the referential information contained in the dialog posting is properly exported to the email message. The dialog posting identifiers listed in the "parents" section of the dialog posting referential information are copied to a standard message header extension "X-Parent-Id" (FIG. 12B) created to support distribution of dialog facilitation system information.

If the dialog posting specifies content-level references to other postings, the references are copied to a message header "X-Section-Id" created to support distribution of dialog facilitation system information. The content-level references specify the posting identifier as well as the begin-mark and end-mark of the referenced posting content section.

Any user-specified intent for the submitted posting is copied to a message header "X-Intent-Id" created to support distribution of dialog facilitation system information. The export process hence completes with the creation of a well-formed (standards-based) email message ready to be distributed by the message transfer agent 104-2 (FIG. 1A).

The services gateway 106 completes the distribution process by requesting the service provider 104-2 to deliver the exported dialog posting (email message). The RFC821 SMTP command "MAIL FROM" is used to request the delivery of the email message. The process completes with the acknowledgement of the MTA for the received request.

The media coordinator 110 enables user-specified and automatic (implicit) markup actions to apply to a dialog, a path, or a posting. Automatic markup actions include actions such as automatically marking a dialog posting item as "read" once the user views the content detail. A user-specified mark up may include tagging a selected posting, path, or dialog for the purpose of categorization. User-specified markups also enable the dialog participant to express that they wish to suppress a dialog or a particular path of a dialog.

FIG. 9 is a flowchart of the markup process.

The process begins when the user (explicitly or implicitly) specifies a markup action for a selected dialog, posting, or path (step 900). For example, the markup action may specify that a particular path or dialog be suppressed (explicit request). Alternatively, the markup action may be trigged by the reading of a posting (implicit request to set "posting read" flag). The media coordinator 110 maps the markup action to one or more dialog postings (step 902). The media coordinator 110 sends a request to the journal keeper 108 to update the corresponding dialog, posting or path properties according to the markup action (step 904). As a result of the update, the journal keeper 108 will distribute dialog update notifications. Finally, the media coordinator 110 notifies the user of the results of the requested markup action.

Intents

According to another aspect of the present invention, the journal keeper 108 checks posting summaries for an indication of intent. An intent represents what is referred to as a "speech-act" or in other words the motivation that resulted in the contributed posting.

A special type of user intent is "share-level". A request by a participant to share a path or a dialog with a specified set of users results in the re-distribution of the dialog posting with a share-level intent specified. The share-level intent is processed during the mapping process and results in the addition of the specified user addresses in the path (for path-level sharing) or dialog (for dialog-sharing) ad-hoc interest groups. After completing all of the above mapping tasks, the journal keeper 108 updates the dialog Store 100-1 by storing the new posting summary and persistently updating the references among parents, siblings as well as properties.

The journal keeper 108 then creates a Dialog Update Notification, targeted to the new users invited to the dialog, where the reason is "new posting", and initiates the process for distributing the Dialog Update Notification. Upon the completion of this process the journal keeper 108 will return the Dialog Identifier to the entity that requested this journal keeper capability.

While the preferred embodiments of the invention have been shown and described, it will be apparent to those skilled in the art that changes and modifications may be made therein without departing from the spirit of the invention, the scope of which is defined by the appended claims.

What is claimed is:

1. A dialog facilitator preserving the spatial and temporal context of a dialog composed of a plurality of postings in an electronic messaging system, the postings being packaged into messages which are sent and received using a messaging system, said dialog facilitator comprising:
    a services gateway exchanging messages with the messaging system, and using information contained in the messages to populate a dialog posting and a posting summary;
    said dialog posting containing a posting identifier uniquely identifying the dialog posting, a dialog identifier identifying the dialog to which the dialog posting corresponds, and posting detail information;
    said posting summary containing addressing information identifying recipients of the corresponding dialog posting, the posting identifier, the dialog identifier, referential information defining the relationship of the posting summary to other posting summaries in the dialog, and content description information;
    a content store for storing at least one said dialog posting;
    a dialog store for altering a posting summary of said at least one dialog posting, a journal keeper coupled to said dialog store for examining said referential information to determine whether said posting summary relates to an existing said posting summary in said dialog store, and assigning a unique dialog identifier to said posting summary if it is not related to an existing posting sumary in said dialog store; and
    a media coordinator using the posting identifier, the dialog identifier, and the referential information to present the spatial and temporal context of a selected dialog posting in relation to other said postings belonging to a given dialog.

2. The dialog facilitator according to claim 1, wherein:
    said journal keeper updates said referential information of related said posting summaries to reference said posting summary, and stores said updated referential information in said dialog store.

3. The dialog facilitator according to claim 1, wherein:
    said media coordinator providing a graphical interface which enables a user to navigate between dialogs and postings belonging to a given dialog, displays the content description information or a selected posting summary, and selectively retrieves one said dialog posting responsive to a user command and displays said posting detail information.

4. The dialog facilitator according to claim 1, wherein:
    said media coordinator includes an interface for composing said dialog posting, said interface prompting the user to specify whether a given said posting is a contribution to an existing dialog or initiates a new dialog; and
    if said given posting is a contribution to an existing dialog, said interface defaulting the dialog identifier of the posting to the dialog identifier of the existing dialog, and defaulting the referential information of the posting to point to the posting within the existing dialog to which said given posting is addressing.

5. The dialog facilitator according to claim 4, wherein:
    said interface enables a user to specify referential information identify at least one specific portion of at least one selected posting to which said given posting is addressing.

6. The dialog facilitator according to claim 4, wherein said interface enables a user to specify intent information.

7. The dialog facilitator according to claim 4, wherein:
    said journal keeper maintains a list of participants for each dialog;
    said interface prompts the user to provide a list of recipients for said given posting; and
    if said given posting is a contribution to an existing dialog, said interface defaults said list of recipients as said list of participants of the dialog to which said given posting is related.

8. The dialog facilitator according to claim 7, wherein:
    said interface enables the user to add additional recipients to the list of recipients, thereby causing the media coordinator to send the posting to the additional recipients and add the additional recipients to the list of participants.

9. The dialog facilitator according to claim 1, wherein:
    said media coordinator graphically depicts the spatial and temporal context of a selected dialog posting using a branch structure illustrating how all postings in a given dialog are related to an initial posting either directly or through another posting; and
    a dialog path consists of a continuous sequence of dialog postings which are related to one another.

10. The dialog facilitator according to claim 7, wherein:
    said media coordinator enables the user to forward a selection selected from one of a dialog posting, a dialog path, and a dialog by specifying the selection and a list of recipients.

11. A dialog facilitator on a host computer, the dialog facilitator preserving the spatial and temporal context of postings within a dialog, the postings being packaged into messages having extended header information which are sent and received using an email client, said dialog facilitator comprising:

- a services gateway retrieving an email message from the email client, and using information contained in the email message to populate a dialog posting containing a posting identifier uniquely identifying the dialog posting, and posting detail information;
- said services gateway using information contained in the email messages to populate a posting summary corresponding to said posting and containing said posting identifier, content description information, and referential information identifying a relationship between one said posting and another said posting;
- a journal keeper receiving said posting summary from said services gateway and storing said posting summary in a dialog store residing on the host computer;
- said journal keeper examining said referential information to determine whether said posting summary relates to another said posting summary in said dialog store;
- said journal keeper assigning a unique dialog identifier to said posting summary if it is not related to another said posting summary in said dialog store, and assigning the dialog identifier of a related said posting summary if said posting summary is related to another said posting summary,
- said journal keeper updating said referential information of said related posting summaries to reference said posting summary, and storing said posting summary in said dialog store; and
- a media coordinator using the posting identifier, the dialog identifier, and the referential information to present the spatial and temporal context of a selected dialog posting in relation to other said postings belonging to a given dialog.

12. The dialog facilitator according to claim 11, wherein: said media coordinator enables a user to navigate between postings and dialogs, displaying the content description information of selected posting summaries, and selectively retrieving a chosen said dialog posting and displaying said posting detail information.

13. The dialog facilitator according to claim 11, wherein: said journal keeper updates said referential information of said posting summaries to reference said posting summary, and stores said updated referential information in said dialog store.

14. The dialog facilitator according to claim 11, wherein: said media coordinator enables a user to navigate between postings belonging to a given dialog, displays the content description information of selected posting summaries, and selectively retrieves a chosen said dialog posting and displays said posting detail information.

15. The dialog facilitator according to claim 11, wherein: said media coordinator includes an interface for composing a given said posting, said interface prompting the user to specify whether said given posting is a contribution to an existing dialog or initiates a new dialog; and if said given posting is a contribution to an existing dialog, said interface defaulting the dialog identifier of the posting to the dialog identifier of the existing dialog, and defaulting the referential information of the posting to point to the posting within the exi sting di alog to which said given posting is addressing.

16. The dialog facilitator according to claim 15, wherein: said interface enables a user to specify referential information identifying at least one specific portion of selected posting(s) to which said given posting is addressing.

17. The dialog facilitator according to claim 15, wherein: said interface enables a user to specify intent information.

18. The dialog facilitator according to claim 15, wherein: said journal keeper maintains a list of participants for each dialog;

said interface prompts the user to provide a list of recipients for said given posting; and if said given posting is a contribution to an existing dialog, said interface defaults said list of recipients as said list of participants of the dialog to which said given posting is related.

19. The dialog facilitator according to claim 18, wherein: said interface enables the user to add additional recipients to the list of recipients, thereby causing the media coordinator to send the posting to the additional recipients and add the additional recipients to the list of participants.

20. The dialog facilitator according to claim 11, wherein: said media coordinator graphically depicts the spatial and temporal context of a selected posting using a branch structure illustrating how all postings in a given dialog are related to an initial posting either directly or through another posting; and wherein a dialog path consists of a continuous sequence of dialog postings including an initial posting of the dialog which are related to one another.

21. The dialog facilitator according to claim 11, wherein: said media coordinator enables the user to forward a selection selected from one of a posting, a dialog path, and a dialog by specifying the selection and a list of recipients.

22. A dialog facilitator preserving the spatial and temporal context of a dialog composed of a plurality of postings in an electronic messaging system, the postings being packaged into messages which are sent and received using a messaging system, said dialing facilitator comprising:

- means for exchanging messages with the messaging system, and using information contained in the messages to populate a dialog posting and a posting summary;
- said dialog posting containing a posting identifier uniquely identifying the dialog posting, a dialog identifier identifying the dialog to which the dialog posting corresponds, and posting detail information;
- said posting summary containing addressing information identifying recipients of the corresponding dialog posting, the posting identifier, the dialog identifier, referential information defining the relationship of the posting summary to other posting summaries in the dialog, and content description information;
- means for storing at least one said dialog posting;
- means for altering a posting summary of said at least one dialog posting;
- means for examining said referential information to determine whether said posting summary relates to an existing said posting summary in said dialog store, and assigning a unique dialog identifier to said posting summary if it is not related to an existing said posting summary in said dialog store; and
- means for presenting the spatial and temporal context of a selected dialog posting in relation to other said postings belonging to a given dialog.

23. The dialog facilitator according to claim 22, wherein:
said means for examining updates said referential information of related said posting summaries to reference said posting summary, and stores said updated referential information in said means for storing.

24. The dialog facilitator according to claim 22, wherein:
said means for presenting enables a user to navigate between postings belonging to a given dialog, displays the content description information of selected posting summaries, and selectively retrieves one said dialog posting responsive to a user command and displays said posting detail information.

25. The dialog facilitator according to claim 22, wherein:
said means for presenting includes an interface for composing said dialog posting, said interface prompting the user to specify whether a given said posting is a contribution to an existing dialog or initiates a new dialog; and
if said given posting is a contribution to an existing dialog, said interface defaulting the dialog identifier of the posting to the dialog identifier of the existing dialog, and defaulting the referential information of the posting to point to the posting within the existing dialog to which said given posting is addressing.

26. The dialog facilitator according to claim 25, wherein:
said interface enables a user to specify referential information identifying at least one specific portion of at least one selected posting to which said given posting is addressing.

27. The dialog facilitator according to claim 25, wherein said interface enables a user to specify intent information.

28. The dialog facilitator according to claim 25, wherein:
said means for examining maintains a list of participants for each dialog;
said interface prompts the user to provide a list of recipients for said given posting; and
if said given posting is a contribution to an existing dialog, said interface defaults said list of recipients as said list of participants of the dialog to which said given posting is related.

29. The dialog facilitator according to claim 28, wherein:
said interface enables the user to add additional recipients to the list of recipients, thereby causing the media coordinator to send the posting to the additional recipients and add the additional recipients to the list of participants.

30. The dialog facilitator according to claim 22, wherein:
said means for presenting graphically depicts the spatial and temporal context of a selected dialog posting using a branch structure illustrating how all postings in a given dialog are related to an initial posting either directly or through another posting; and
a dialog path consists of a continuous sequence of dialog postings, including an initial posting of the dialog, which are related to one another.

31. The dialog facilitator according to claim 28, wherein:
said means for presenting enables the user to forward a selection selected from one of a posting, a dialog path, and a dialog by specifying the selection and a list of recipients.

32. A dialog facilitator on a host computer, the dialog facilitator preserving the spatial and temporal context of postings within a dialog, the postings being packaged into email messages having extended header information which are sent and received using an email client, said dialog facilitator comprising:
means for retrieving an email message from the email client, and using information contained in the email message to populate a dialog posting containing a posting identifier uniquely identifying the dialog posting, and posting detail information;
said means for retrieving using information contained in the email messages to populate a posting summary corresponding to said posting and containing said posting identifier, content description information, and referential information identifying a relationship between said posting and another said posting;
means for receiving said posting summary from said services gateway and storing said posting summary in a dialog store residing on the host computer;
means for receiving examining said referential information to determine whether said posting summary relates to another said posting summary in said dialog store;
means for receiving assigning a unique dialog identifier to said posting summary if it is not related to another said posting summary in said dialog store, and assigning the dialog identifier of a related said posting summary if said posting summary is related to another said posting summary;
means for receiving updating said referential information of said related dialog summaries to reference said posting summary, and storing said posting summary in said dialog store; and
means for presenting the spatial and temporal context of a selected dialog posting in relation to other said postings belonging to a given dialog.

* * * * *